United States Patent
Zhao et al.

(10) Patent No.: US 12,108,040 B2
(45) Date of Patent: Oct. 1, 2024

(54) VIDEO ENCODER AND QP SETTING METHOD

(71) Applicant: Huawei Technologies Co., Ltd., Guangdong (CN)

(72) Inventors: Yin Zhao, Hangzhou (CN); Haitao Yang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 216 days.

(21) Appl. No.: 17/670,622

(22) Filed: Feb. 14, 2022

(65) Prior Publication Data
US 2022/0166982 A1  May 26, 2022

Related U.S. Application Data

(63) Continuation of application No. PCT/CN2020/108337, filed on Aug. 11, 2020.

(30) Foreign Application Priority Data

Aug. 15, 2019  (CN) .......................... 201910755044.8
Jul. 25, 2020  (CN) .......................... 202010735425.2

(51) Int. Cl.
*H04N 19/124* (2014.01)
*H04N 17/00* (2006.01)
(Continued)

(52) U.S. Cl.
CPC ......... *H04N 19/124* (2014.11); *H04N 19/103* (2014.11); *H04N 19/167* (2014.11); *H04N 19/186* (2014.11); *H04N 19/50* (2014.11)

(58) Field of Classification Search
None
See application file for complete search history.

(56) References Cited

U.S. PATENT DOCUMENTS

2013/0287103 A1* 10/2013 Seregin ................. H04N 19/61
375/240.12
2014/0341276 A1  11/2014 Lee
(Continued)

FOREIGN PATENT DOCUMENTS

CN    107948651 A    4/2018
CN    109089115 A    12/2018
(Continued)

OTHER PUBLICATIONS

Chernyak et al., "Delta QP and Chroma QP Offset for Separate Tree", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0428-v1.*
(Continued)

*Primary Examiner* — Edemio Navas, Jr.
(74) *Attorney, Agent, or Firm* — WOMBLE BOND DICKINSON (US) LLP

(57) ABSTRACT

This application discloses a quantization parameter (QP) setting method includes: determining that a current coding unit (CU) is a chroma CU; and separately performing the following processing on at least one luma CU: when the at least one luma CU has no residual, and both a previous luma CU and a luma-chroma CU that have been encoded before the at least one luma CU in the current quantization group (QG) have no residual, modifying a basic QP of the at least one luma CU to a predictive QP; setting a basic QP of the current CU to the basic QP of the at least one luma CU corresponding to the preset position of the current CU; and performing encoding processing on the current CU based on the basic QP of the current CU.

20 Claims, 13 Drawing Sheets

(51) Int. Cl.
H04N 19/103 (2014.01)
H04N 19/167 (2014.01)
H04N 19/186 (2014.01)
H04N 19/50 (2014.01)

(56) References Cited

U.S. PATENT DOCUMENTS

2016/0261864 A1  9/2016  Samuelsson et al.
2019/0124330 A1  4/2019  Chien et al.

FOREIGN PATENT DOCUMENTS

| CN | 109196863 A | 1/2019 |
| CN | 109302611 A | 2/2019 |
| CN | 109479133 A | 3/2019 |
| CN | 109964483 A | 7/2019 |
| EP | 2854404 A2 | 4/2015 |
| WO | 2017219342 A1 | 12/2017 |
| WO | WO-2020117781 A1 * | 6/2020 |

OTHER PUBLICATIONS

Chernyak (Huawei) R et al: "Delta QP and Chroma QP Offset forSeparate Tree", 12. JVET Meeting; Oct. 3, 2018-Oct. 12, 2018; Macao; (The Joint Videoexploration Team of 1S0/IEC JTC1/SC29/WG11 and ITU-T SG.16), No. JVET-L0428 Oct. 11, 2018 (Oct. 11, 2018), XP030195395, Retrieved from the Internet:URL:http://phenix.int-evry.fr/jvet/doc_end_user/documents/12_Macao/wg11 /JVET-L0428-v3.zip JVET-L0428-v1.docx[retrieved on Oct. 11, 2018].

Kondo K et al: "Improvement of delta-OP Coding",6. JCT-VC Meeting; 97. MPEG Meeting; Jul. 14, 2011-Jul. 22, 2011;Torino; (Joint Collaborative Team on Video Coding of ISO/IEC JTC1 /SC29/WG11 and ITU-T SG.16); URL: http://wftp3.itu.int/av-arch/jctvc-site/, No. JCTVC-F422, Jul. 1, 2011 (Jul. 1, 2011), XP030009445.

Zhao Y et al: "AHG16: Fix on local dual tree", 16. JVET Meeting; Oct. 1, 2019-Oct. 11, 2019; Geneva; (The Joint Videoexploration Team of 1S0/IEC JTC1/SC29/WG11 and ITU-T SG. 16 ), No. JVET-P0063 ; m50005 Oct. 3, 2019 (Oct. 3, 2019), XP030216103, Retrieved from the Internet:URL:http://phenix.int-evry.fr/jvet/doc_end_user/documents/16_Geneva/wg11 /JVET-P0063-v2.zip JVET-P0063-v2.docx[retrieved on Oct. 3, 2019].

Zhao Yin: "Fix #450 and #441: mismatch of chroma qp related to JVET-00050 (1848) . Merge requests . jvet / VVCSoftware_VTM . Gitlab", Aug. 14, 2019 (Aug. 14, 2019), pp. 1-1, XP055952722, Retrieved from the Internet: URL:https://vcgit.hhi.fraunhofer.de/jvet/VVCSoftware_ VTM/-/merge_requests/848#note_6497.

Document: JVET-L0428-v1, Roman Chernyak et al., Delta QP and Chroma QP Offset for Separate Tree, Joint Video Experts Team (JVET) of ITU-T SG 16 WP 3 and ISO/IEC JTC 1/SC 29/WG 11, 12th Meeting: Macao, CN, Oct. 3-12, 2018, total 5 pages.

ITU-T H.261 (Mar. 1993), Line Transmission of Non-Telephone Signals, Video Codec for Audiovisual Services AT p x 64 kbits, total 29 pages.

Document: JVET-O0298-r1, Seethal Paluri et al, AHG15: Chroma Quantization QpC Parameter Signalling, Joint Video Experts Team (JVET)of ITU-T SG 16 WP 3 and ISO/IEC JTC 1/SC 29/WG 11, 15th Meeting: Gothenburg, SE, Jul. 3-12, 2019, total 9 pages.

ITU-T H.262 (Feb. 2012), Series H: Audiovisual and Multimedia Systems, Infrastructure of audiovisual services—Coding of moving video Information technology—Generic coding of moving pictures and associated audio information: Video: Frame packing arrangement signalling for 3D content, total 238 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Jun. 2019) , Series H: Audiovisual and Multimedia Systems, Infrastructure of audiovisual services—Coding of moving video , Advanced video coding for generic audiovisual services, total 836 pages.

ITU-T H.265(Feb. 2018), Series H: Audiovisual and Multimedia Systems Infrastructure of audiovisual services—Coding of moving video, High efficiency video coding, total 692 pages.

Document: JVET-J0050-r2, Xiaozhong Xu et al, Intra block copy improvement on top of Tencent s CfP response, Joint Video Experts Team (JVET) of ITU-T SG 16 WP 3 and ISO/IEC JTC 1/SC 29/WG 11, 10th Meeting: San Diego, US, Apr. 10-20, 2018, total 3 pages.

* cited by examiner

VIDEO ENCODER AND QP SETTING METHOD

CROSS-REFERENCE TO RELATED APPLICATIONS

This application is a continuation of International Application No. PCT/CN2020/108337, filed on Aug. 11, 2020, which claims priority to Chinese Patent Application No. 201910755044.8, filed on Aug. 15, 2019, and Chinese Patent Application No. 202010735425.2, filed on Jul. 25, 2020. The disclosures of the aforementioned applications are hereby incorporated by reference in their entireties.

TECHNICAL FIELD

Embodiments of this application (disclosure) generally relate to the field of video coding, and more specifically, to a video encoder and a quantization parameter (QP) setting method.

BACKGROUND

Video coding (video encoding and decoding) is used in a wide range of digital video applications, for example, broadcast digital television, video transmission over the internet and mobile networks, real-time conversational applications such as video chat and video conferencing, digital video discs (DVDs) and Blu-ray discs, video content collection and editing systems, and camcorders of security applications.

With development of a block-based hybrid video coding approach in the H.261 standard in 1990, new video coding technologies and tools are developed and form a basis for new video coding standards. Other video coding standards include Moving Picture Experts Group-1 (MPEG-1) video, MPEG-2 video, International Telecommunication Union Telecommunication Standardization Sector (ITU-T) H.262/MPEG-2, ITU-T H.263, ITU-T H.264/MPEG-4 Part 10: advanced video coding (AVC), ITU-T H.265/high efficiency video coding (HEVC), and extensions, for example, scalability and/or 3D (three-dimensional) extensions, of these standards. As videos are created and used more widely, video traffic is a biggest burden on communication networks and data storage. Therefore, one of goals of most of the video coding standards is to reduce a bit rate without sacrificing picture quality in comparison with a previous standard. Even though the latest HEVC enables a video to be compressed about twice as much as AVC without sacrificing picture quality, a new technology is urgently needed to further compress the video in comparison with HEVC.

SUMMARY

Embodiments of the present disclose a video encoder and a QP setting method, to correctly set a basic QP of each coding unit (CU), so that the basic QP is the same as a basic QP result obtained through decoding at a decoder side, to ensure consistency between an encoder side and the decoder side.

The foregoing and other objects are achieved by the subject matter of the independent claims. Other implementations are apparent from the dependent claims, the specification, and the accompanying drawings.

A first aspect discloses a QP setting method, applied to a video picture encoding process. The method includes: determining that a current CU is a luma CU, a luma-chroma CU, or a chroma CU, where the current CU is any CU in a current quantization group (QG: Quantization Group); if the current CU is a luma CU or a luma-chroma CU, setting a basic QP of the current CU to a target QP; performing encoding processing on the current CU based on the basic QP of the current CU; and if the current CU has no residual, and both a luma CU and a luma-chroma CU that have been encoded before the current CU in the current QG have no residual, modifying the basic QP of the current CU to a predictive QP; and if the current CU is a chroma CU, setting a basic QP of the current CU to a basic QP of a luma CU corresponding to a central position of the current CU; and performing encoding processing on the current CU based on the basic QP of the current CU.

A second aspect discloses a QP setting method, applied to a video picture encoding process. The method includes: setting a first parameter to a first value when encoding processing is started for a current QG; determining that a current CU is a luma CU, a luma-chroma CU, or a chroma CU, where the current CU is any CU in the current QG; if the current CU is a luma CU or a luma-chroma CU, setting a basic QP of the current CU to a target QP; performing encoding processing on the current CU based on the basic QP of the current CU; and if the current CU has no residual and the first parameter is the first value, modifying the basic QP of the current CU to a predictive QP; or if the current CU has a residual, modifying a value of the first parameter to a second value; and if the current CU is a chroma CU, setting a basic QP of the current CU to a basic QP of a luma CU corresponding to a central position of the current CU; and performing encoding processing on the current CU based on the basic QP of the current CU.

A third aspect discloses a QP setting method, applied to a video picture encoding process. The method includes: determining that a current CU is a luma CU, a luma-chroma CU, or a chroma CU, where the current CU is any CU in a current QG; if the current CU is a luma-chroma CU, setting a basic QP of the current CU to a target QP; and performing encoding processing on the current CU based on the basic QP of the current CU; if the current CU is a luma CU, setting a basic QP of the current CU to a target QP; performing encoding processing on the current CU based on the basic QP of the current CU; and if the current CU has no residual, and both a luma CU and a luma-chroma CU that have been encoded before the current CU in the current QG have no residual, modifying the basic QP of the current CU to a predictive QP; if the current CU is a chroma CU, setting a basic QP of the current CU to a basic QP of a luma CU corresponding to a central position of the current CU; and performing encoding processing on the current CU based on the basic QP of the current CU; after encoding processing for all CUs in the QG is completed, determining a first luma CU or luma-chroma CU having a residual in all the CUs; and modifying basic QPs of all luma CUs and luma-chroma CUs that have been encoded before the first luma CU or luma-chroma CU having a residual to the predictive QP; or modifying basic QPs of all luma-chroma CUs that have been encoded before the first luma CU or luma-chroma CU having a residual to the predictive QP.

A fourth aspect discloses a QP setting method, applied to a video picture encoding process. The method includes: determining that a current CU is a chroma CU, where the current CU is any CU in a current QG; and if the current CU is a chroma CU, separately performing the following processing on at least one luma CU corresponding to the current CU: if the luma CU has no residual, and both a luma CU and a luma-chroma CU that have been encoded before the luma CU in the current QG have no residual, modifying a basic QP of the luma CU to a predictive QP, where the at least one luma CU includes a luma CU corresponding to a central position of the current CU; setting a basic QP of the current CU to the basic QP of the luma CU corresponding to the central position of the current CU; and performing encoding processing on the current CU based on the basic QP of the current CU.

With reference to the fourth aspect, in some embodiments, the method further includes: determining that the current CU is a chroma CU or a luma CU; if the current CU is a luma CU or a luma-chroma CU, setting a basic QP of the current CU to a target QP; and performing encoding processing on the current CU based on the basic QP of the current CU.

With reference to the fourth aspect, in some embodiments, the method further includes: determining that a second CU is a chroma CU or a luma CU; setting a basic QP of the second CU to a target QP; and performing encoding processing on the second CU based on the basic QP of the second CU.

With reference to the fourth aspect or some embodiments of the fourth aspect, in some embodiments, the method further includes: after encoding processing for all CUs in the QG is completed, determining a first luma CU or luma-chroma CU having a residual in all the CUs; and modifying basic QPs of CUs except the at least one luma CU in all luma CUs and luma-chroma CUs that have been encoded before the first luma CU or luma-chroma CU having a residual to the predictive QP; or modifying basic QPs of all luma-chroma CUs that have been encoded before the first luma CU or luma-chroma CU having a residual to the predictive QP.

With reference to any one of the first aspect to the fourth aspect, in some embodiments, the performing encoding processing on the current CU based on the basic QP of the current CU includes: performing quantization processing on the current CU based on the basic QP of the current CU; or performing dequantization processing on the current CU based on the basic QP of the current CU.

With reference to any one of the first aspect to the fourth aspect, or any one of the embodiments of the first aspect to the fourth aspect, in some embodiments, for a luma CU, a luma QP in the CU is a basic QP of the CU; for a chroma CU, a chroma basic QP in the CU is a basic QP of the CU; or for a luma-chroma CU, a luma QP in the CU is a basic QP of the CU, and a chroma basic QP in the CU is equal to the luma QP.

With reference to any one of the first aspect to the fourth aspect, or any one of the embodiments of the first aspect to the fourth aspect, some embodiments, the target QP is a sum of the predictive QP and a delta QP.

A fifth aspect discloses a video encoder. The video encoder includes: a determining unit, configured to determine that a current CU is a luma CU, a luma-chroma CU, or a chroma CU, where the current CU is any CU in a current QG; a luma CU processing unit, configured to: when the current CU is a luma CU or a luma-chroma CU, set a basic QP of the current CU to a target QP; perform encoding processing on the current CU based on the basic QP of the current CU; and if the current CU has no residual, and both a luma CU and a luma-chroma CU that have been encoded before the current CU in the current QG have no residual, modify the basic QP of the current CU to a predictive QP; and a chroma CU processing unit, configured to: when the current CU is a chroma CU, set a basic QP of the current CU to a basic QP of a luma CU corresponding to a central position of the current CU; and perform encoding processing on the current CU based on the basic QP of the current CU.

A sixth aspect discloses a video encoder. The video encoder includes: a parameter setting unit, configured to set a first parameter to a first value when encoding processing is started for a current QG; a determining unit, configured to determine that a current CU is a luma CU, a luma-chroma CU, or a chroma CU, where the current CU is any CU in the current QG; a luma CU processing unit, configured to: when the current CU is a luma CU or a luma-chroma CU, set a basic QP of the current CU to a target QP; perform encoding processing on the current CU based on the basic QP of the current CU; and if the current CU has no residual and the first parameter is the first value, modify the basic QP of the current CU to a predictive QP; or if the current CU has a residual, modify a value of the first parameter to a second value, where the second value is different from the first value; and a chroma CU processing unit, configured to: when the current CU is a chroma CU, set a basic QP of the current CU to a basic QP of a luma CU corresponding to a central position of the current CU; and perform encoding processing on the current CU based on the basic QP of the current CU.

A seventh aspect discloses a video encoder. The video encoder includes: a determining unit, configured to determine that a current CU is a luma CU, a luma-chroma CU, or a chroma CU, where the current CU is any CU in a current QG; a luma-chroma CU processing unit, configured to: when the current CU is a luma-chroma CU, set a basic QP of the current CU to a target QP; and perform encoding processing on the current CU based on the basic QP of the current CU; a luma CU processing unit, configured to: when the current CU is a luma CU, set a basic QP of the current CU to a target QP; perform encoding processing on the current CU based on the basic QP of the current CU; and if the current CU has no residual, and both a luma CU and a luma-chroma CU that have been encoded before the current CU in the current QG have no residual, modify the basic QP of the current CU to a predictive QP; a chroma CU processing unit, configured to: when the current CU is a chroma CU, set a basic QP of the current CU to a basic QP of a luma CU corresponding to a central position of the current CU; and perform encoding processing on the current CU based on the basic QP of the current CU; and a modification unit, configured to: after encoding processing for all CUs in the QG is completed, determine a first luma CU or luma-chroma CU having a residual in all the CUs; and modify basic QPs of all luma CUs and luma-chroma CUs that have been encoded before the first luma CU or luma-chroma CU having a residual to the predictive QP; or modify basic QPs of all luma-chroma CUs that have been encoded before the first luma CU or luma-chroma CU having a residual to the predictive QP.

An eighth aspect discloses a video encoder. The video encoder includes: a determining unit, configured to determine that a current CU is a luma CU, a luma-chroma CU, or a chroma CU, where the current CU is any CU in a current QG; and a chroma CU processing unit, configured to: when the current CU is a chroma CU, separately perform the following processing on at least one luma CU corresponding to the current CU: if the luma CU has no residual, and both a luma CU and a luma-chroma CU that have been encoded before the luma CU in the current QG have no residual, modifying a basic QP of the luma CU to a predictive QP, where the at least one luma CU includes a luma CU corresponding to a central position of the current CU; setting a basic QP of the current CU to the basic QP of the luma CU corresponding to the central position of the current CU; and performing encoding processing on the current CU based on the basic QP of the current CU.

With reference to the eighth aspect, some embodiments, the determining unit is further configured to determine that the current CU is a luma CU or a luma-chroma CU; and the video encoder further includes: a luma CU processing unit, configured to: when the current CU is a luma CU or a luma-chroma CU, set a basic QP of the current CU to a target QP; and perform encoding processing on the current CU based on the basic QP of the current CU.

With reference to the eighth aspect or the embodiments of the eighth aspect, some embodiments, the video encoder further includes: a modification unit, configured to: after encoding processing for all CUs in the QG is completed, determine a first luma CU or luma-chroma CU having a residual in all the CUs; and modify basic QPs of CUs except the at least one luma CU in all luma CUs and luma-chroma CUs that have been encoded before the first luma CU or luma-chroma CU having a residual to the predictive QP; or modify basic QPs of all luma-chroma CUs that have been encoded before the first luma CU or luma-chroma CU having a residual to the predictive QP.

With reference to any one of the fifth aspect to the eighth aspect, some embodiments, the performing encoding processing on the current CU based on the basic QP of the current CU includes: performing quantization processing on the current CU based on the basic QP of the current CU; or performing dequantization processing on the current CU based on the basic QP of the current CU.

With reference to any one of the fifth aspect to the eighth aspect, or any one of the embodiments of the fifth aspect to the eighth aspect, some embodiments, for a luma CU, a luma QP in the CU is a basic QP of the CU; for a chroma CU, a chroma basic QP in the CU is a basic QP of the CU; or for a luma-chroma CU, a luma QP in the CU is a basic QP of the CU, and a chroma basic QP in the CU is equal to the luma QP.

With reference to any one of the fifth aspect to the eighth aspect, or any one of the embodiments of the fifth aspect to the eighth aspect, in some embodiments, the target QP is a sum of the predictive QP and a delta QP.

A ninth aspect discloses a video encoding device. The video encoding device includes: a memory, configured to store a program; and a processor, configured to execute the program stored in the memory. When the program stored in the memory is executed by the processor, the processor performs the method according to any one of the first aspect to the fourth aspect or any one of the embodiments of the first aspect to the fourth aspect.

A tenth aspect discloses a computer-readable storage medium. The computer-readable storage medium stores a computer program executable by a processor. When the computer program is executed by the processor, the processor performs the method according to any one of the first aspect to the fourth aspect or any one of the embodiments of the first aspect to the fourth aspect.

An eleventh aspect discloses a computer program. When the computer program is executed by a processor, the processor performs the method according to any one of the first aspect to the fourth aspect or any one of the embodiments of the first aspect to the fourth aspect.

A twelfth aspect discloses a computer-readable storage medium. The computer-readable storage medium stores a bitstream generated in the video picture encoding process according to any one of the first aspect to the fourth aspect or any one of the embodiments of the first aspect to the fourth aspect.

It should be understood that, the technical solutions in the second aspect to the twelfth aspect of this application are consistent with the technical solution in the first aspect. Beneficial effects achieved in the various aspects and corresponding feasible embodiments are similar, and details are not described again.

Details of one or more embodiments are described in the accompanying drawings and the following description. Other features, objects, and advantages are apparent from the specification, accompanying drawings, and claims.

BRIEF DESCRIPTION OF DRAWINGS

To describe the technical solutions in the embodiments of this application or in the background more clearly, the following describes the accompanying drawings for describing the embodiments of this application or the background.

Figure 1A:
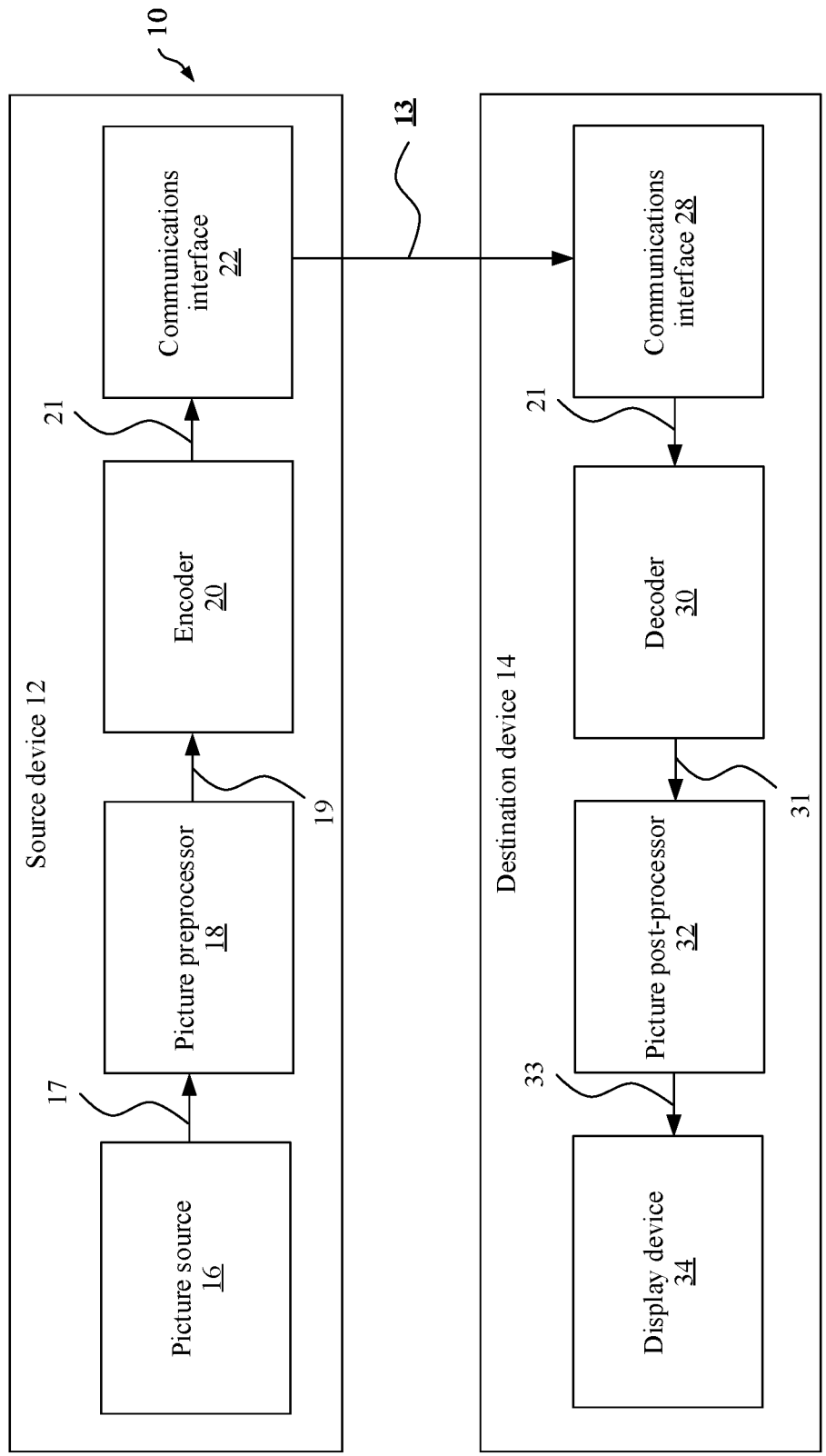
FIG. 1A is a block diagram of an example of a video encoding and decoding system 10 for implementing an embodiment of this application.

In the following, identical reference signs represent identical or at least functionally equivalent features unless otherwise specified.

DESCRIPTION OF EMBODIMENTS

The following describes the embodiments of this application with reference to the accompanying drawings in the embodiments of this application. In the following description, reference is made to the accompanying drawings that form a part of this disclosure and show, by way of illustration, aspects of the embodiments of this application or aspects in which the embodiments of this application may be used. It should be understood that the embodiments of this application may be used in other aspects, and may include structural or logical changes not depicted in the accompanying drawings. Therefore, the following detailed description shall not be understood in a limiting sense, and the scope of this application is defined by the appended claims. For example, it should be understood that disclosed content with reference to a described method is also applicable to a corresponding device or system configured to perform the method, and vice versa. For example, if one or more method operations are described, a corresponding device may include one or more units such as functional units for performing the described one or more method operations (for example, one unit performs the one or more operations; or a plurality of units, each of which performs one or more of the plurality of operations), even if such one or more units are not explicitly described or illustrated in the accompanying drawings. In addition, for example, if an apparatus is described based on one or more units such as a functional unit, a corresponding method may include a operation used to perform one or more functionalities of one or more units (for example, one operation used to perform one or more functionalities of one or more units; or a plurality of operations, each of which is used to perform one or more functionalities of one or more units in a plurality of units), even if such one or more of operations are not explicitly described or illustrated in the accompanying drawings. Further, it should be understood that features of various example embodiments and/or aspects described in this specification may be combined with each other, unless otherwise specified.

The technical solutions in the embodiments of this application are not only applicable to existing video coding standards (for example, standards such as H.264 and HEVC), but also applicable to a future video coding standard (for example, the H.266 standard). Terms used in this application are merely intended to explain embodiments of this application, but are not intended to limit this application. The following first briefly describes related concepts in the embodiments of this application.

Video coding typically refers to processing of a sequence of pictures, where the sequence of pictures forms a video or a video sequence. In the video coding field, the terms "picture", "frame", and "image" may be used as synonyms. Video coding used in this application (or this disclosure) indicates video encoding or video decoding. Video encoding is performed at a source side, and typically includes processing (for example, by compression) an original video picture to reduce an amount of data for representing the video picture (for more efficient storage and/or transmission). Video decoding is performed at a destination side, and typically includes inverse processing in comparison with an encoder to reconstruct the video picture. "Coding" of a video picture (or generally referred to as a picture, which is explained below) in the embodiments should be understood as "encoding" or "decoding" of a video sequence. A combination of an encoding part and a decoding part is also referred to as coding (encoding and decoding).

A video sequence includes a series of pictures, the picture is further split into slices, and the slice is further split into blocks. Video coding is performed by block. In some new video coding standards, the concept "block" is further expanded. For example, in the H.264 standard, there is a macroblock (MB), and the macroblock may be further split into a plurality of prediction blocks that can be used for predictive coding. In the HEVC standard, a plurality of block units are classified based on functions by using basic concepts such as a coding unit (CU), a prediction unit (PU), and a transform unit (TU), and are described by using a new tree-based structure. For example, a CU may be split into smaller CUs based on a quadtree, and the smaller CU may be further split, to form a quadtree structure. The CU is a basic unit for splitting and encoding a coding picture. A PU and a TU also have similar tree structures. The PU may correspond to a prediction block, and is a basic unit for predictive coding. The CU is further split into a plurality of PUs in a split mode. The TU may correspond to a transform block, and is a basic unit for transforming a prediction residual. However, in essence, all of the CU, the PU, and the TU are concepts of blocks (or picture blocks).

For example, in HEVC, a CTU is split into a plurality of CUs by using a quadtree structure represented as a coding tree. A decision on whether to code a picture region by using inter-picture (temporal) or intra-picture (spatial) prediction is made at a CU level. Each CU may be further split into one, two, or four PUs based on a PU split type. In one PU, a same prediction process is applied, and related information is transmitted to a decoder on a PU basis. After a residual block is obtained by applying the prediction process based on the PU split type, the CU may be partitioned into transform units (TUs) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a picture block to be processed in a current picture may be referred to as a current block or a to-be-processed picture block. For example, in encoding, the picture block is a block that is being encoded, and in decoding, the picture block is a block that is being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, an original video picture can be reconstructed, that is, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side, that is, quality of a reconstructed video picture is lower or poorer than quality of the original video picture.

Several H.261 video coding standards are used for "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On a decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, a subsequent block.

As used in this specification, the term "block" may be a part of a picture or a frame. For ease of description, the embodiments of the present disclosure are described with reference to versatile video coding (VVC) or high efficiency video coding (HEVC) developed by the Joint Collaborative Team on Video Coding (JCT-VC) of the ITU-T Video Coding Experts Group (VCEG) and the ISO/IEC Moving Picture Experts Group (MPEG). A person of ordinary skill in the art understands that the embodiments of the present disclosure are not limited to HEVC or VVC, and the block may be a CU, a PU, or a TU. In HEVC, a CTU is split into a plurality of CUs by using a quadtree structure represented as a coding tree. A decision on whether to code a picture region by using inter-picture (temporal) or intra-picture (spatial) prediction is made at a CU level. Each CU may be further split into one, two, or four PUs based on a PU split type. In one PU, a same prediction process is applied, and related information is transmitted to a decoder on a PU basis. After a residual block is obtained by applying the prediction process based on the PU split type, the CU may be partitioned into transform units (TUs) based on another quadtree structure similar to the coding tree used for the CU. In the recent development of video compression technologies, a quadtree plus binary tree (QTBT) partition frame is used to partition a coding block. In a QTBT block structure, the CU may be square or rectangular. In VVC, a coding tree unit (CTU) is first partitioned by using a quadtree structure. A quadtree leaf node is further partitioned by using a binary tree structure. A binary tree leaf node is referred to as a coding unit (CU), and the partition is used for prediction and transform processing without any other partitioning. This means that the CU, the PU, and the TU have a same block size in a QTBT coding block structure. In addition, multiply partition is used together with the QTBT block structure, for example, ternary tree partition.

The following describes a system architecture to which the embodiments of this application are applied. FIG. 1A is a schematic block diagram of an example of a video encoding and decoding system 10 to which an embodiment of this application is applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various embodiments, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may constitute a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. In some embodiments, the source device 12 may further include a picture source 16, a picture preprocessor 18, and a communications interface 22. In some embodiments, the encoder 20, the picture source 16, the picture preprocessor 18, and the communications interface 22 may be hardware components in the source device 12, or may be software programs in the source device 12. Descriptions are separately provided as follows.

The picture source 16 may include or be any type of picture capturing device configured to, for example, capture a real-world picture; and/or any type of device for generating a picture or comment (for screen content coding, some text on a screen is also considered as a part of a to-be-coded picture or image), for example, a computer graphics processing unit configured to generate a computer animation picture; or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the source device. When the picture source 16 is a memory, the picture source 16 may be a local memory or, for example, a memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

A picture may be considered as a two-dimensional array or matrix of pixels. The pixel in the array may also be referred to as a sample. A quantity of samples in horizontal and vertical directions (or axes) of the array or the picture defines the size and/or resolution of the picture. For representation of a color, three color components are usually used. For example, the picture may be represented as or include three sample arrays. For example, in an RBG format or color space, the picture includes corresponding red, green, and blue sample arrays. However, in video coding, each pixel is usually represented in a luma/chroma format or color space. For example, a picture in a YUV format includes a luma component indicated by Y (or sometimes indicated by L) and two chroma components indicated by U and V. The luma component Y represents brightness or gray level intensity (for example, both are the same in a grayscale picture), and the two chroma (chroma) components U and V represent chroma or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In this embodiment of this application, a picture transmitted by the picture source 16 to the picture preprocessor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or denoising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of a QP setting method described in this application.

The communications interface 22 may be configured to receive the encoded picture data 21, and transmit the encoded picture data 21 to the destination device 14 or any other device (for example, a memory) through the link 13 for storage or direct reconstruction. The any other device may be any device used for decoding or storage. The communications interface 22 may be, for example, configured to encapsulate the encoded picture data 21 in an appropriate format, for example, into a data packet, for transmission over the link 13.

The destination device 14 includes a decoder 30. In some embodiments, the destination device 14 may further include a communications interface 28, a picture post-processor 32, and a display device 34. Descriptions are separately provided as follows.

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (or referred to as a video decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of a QP setting method described in this application.

The picture post-processor 32 is configured to perform post-processing on the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or may include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any one of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSPs), application-specific integrated circuits (ASICs), field programmable gate arrays (FPGAs), discrete logic, hardware, or any combination thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the video encoding and decoding system 10 shown in FIG. 1A is merely an example and the technologies of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with each other, but simply encode data and store encoded data into the memory and/or retrieve data from the memory and decode the data.

Figure 1B:
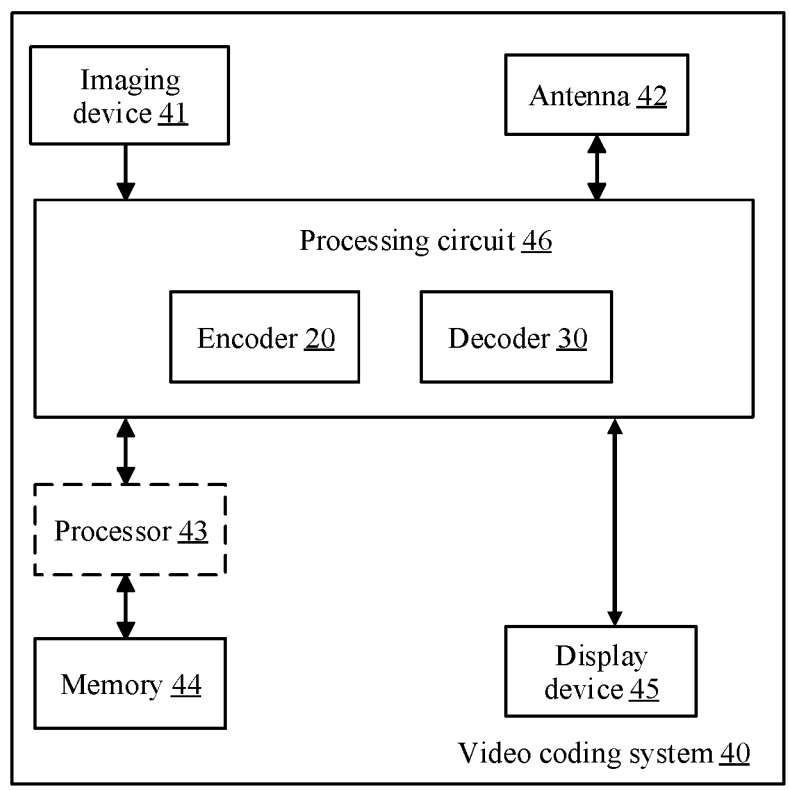
FIG. 1B is a block diagram of an example of a video coding system 40 for implementing an embodiment of this application.
Figure 2:
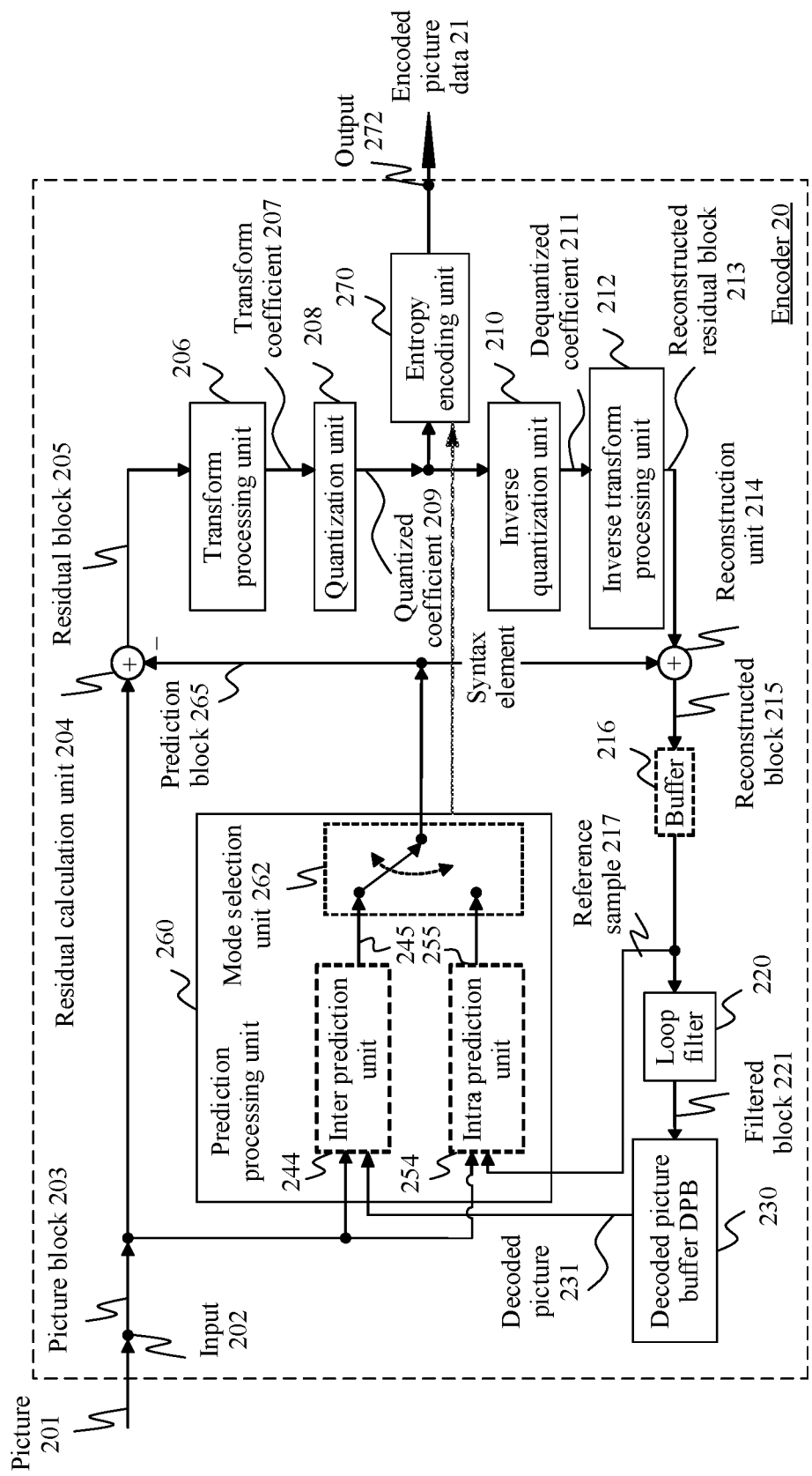
FIG. 2 is a block diagram of an example structure of an encoder 20 for implementing an embodiment of this application.
Figure 3:
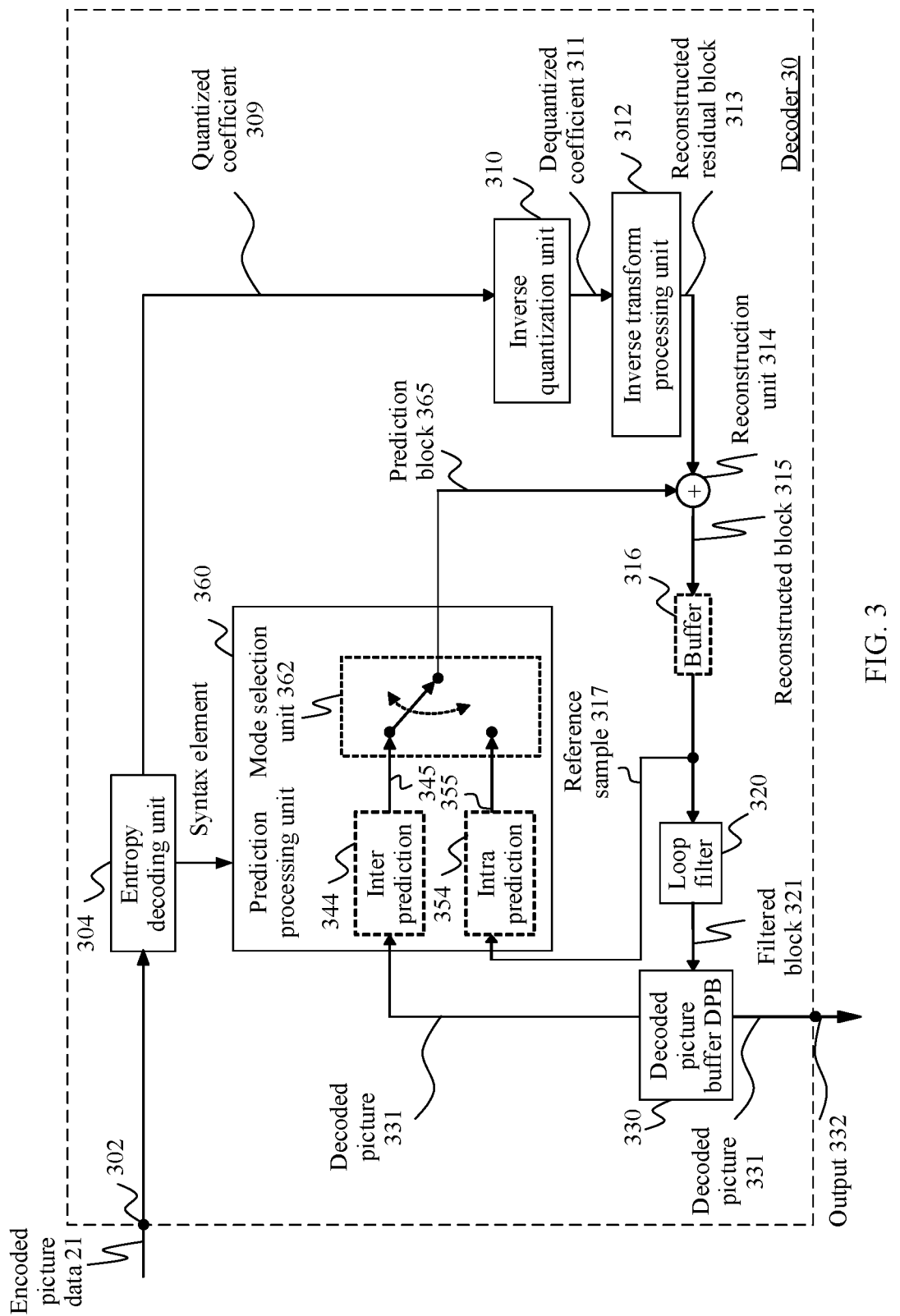
FIG. 3 is a block diagram of an example structure of a decoder 30 for implementing an embodiment of this application.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of this application. In an illustrated embodiment, the video coding system 40 may include an imaging device 41, the encoder 20, the decoder 30 (and/or a video encoder/decoder implemented by a logic circuit 47 of a processing circuit 46), an antenna 42, one or more processors 43, one or more memories 44, and/or a display device 45.

As shown in FIG. 1B, the imaging device 41, the antenna 42, the processing circuit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing circuit 46. The processing circuit 46 may include application-specific integrated circuit (ASIC) logic, a graphics processing unit, a general-purpose processor, or the like. The video coding system 40 may alternatively include an optional processor 43. The optional processor 43 may similarly include ASIC logic, a graphics processing unit, a general-purpose processor, or the like. In some examples, the logic circuit 47 may be implemented by using hardware, for example, dedicated hardware for video coding. The processor 43 may be implemented by using general-purpose software, an operating system, or the like. In addition, the memory 44 may be any type of memory, for example, a volatile memory (for example, a static random access memory (SRAM), a dynamic random access memory (DRAM)), or a non-volatile memory (for example, a flash memory). In a non-limitative example, the memory 44 may be implemented by a cache memory. In some examples, the logic circuit 47 may access the memory 44 (for example, for implementing a picture buffer). In other examples, the logic circuit 47 and/or the processing circuit 46 may include a memory (for example, a cache) for implementing a picture buffer or the like.

In some examples, the encoder 20 implemented by the logic circuit may include a picture buffer (which is implemented by, for example, the processing circuit 46 or the memory 44) and a graphics processing unit (which is implemented by, for example, the processing circuit 46). The graphics processing unit may be communicatively coupled to the picture buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by the logic circuit may include a picture buffer (which is implemented by the processing circuit 46 or the memory 44) and a graphics processing unit (which is implemented by, for example, the processing circuit 46). The graphics processing unit may be communicatively coupled to the picture buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame coding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of this application, for the example described with reference to the encoder 20, the decoder 30 may be configured to perform an inverse process. With regard to a signaling syntax element, the decoder 30 may be configured to receive and parse the syntax element and correspondingly decode related video data. In some examples, the encoder 20 may entropy-encode the syntax element into an encoded video bitstream. In such examples, the decoder 30 may parse the syntax element and correspondingly decode the related video data.

It should be noted that a video picture encoding method described in the embodiments of this application is performed by the encoder 20 and a video picture decoding method described in the embodiments of this application is performed by the decoder 30. The encoder 20 and the decoder 30 in the embodiments of this application may be, for example, an encoder/a decoder corresponding to a video standard protocol such as H.263, H.264, HEVV, MPEG-2, MPEG-4, VP8, or VP9, or a next-generation video standard protocol (for example, H.266).

FIG. 2 is a schematic/conceptual block diagram of an example of an encoder 20 for implementing an embodiment of this application. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (which are not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to the decoder 30 in FIG. 3).

The encoder 20 receives, for example, through an input 202, a picture 201 or a picture block 203 of the picture 201, for example, a picture in a sequence of pictures forming a video or a video sequence. The picture block 203 may also be referred to as a current picture block or a to-be-coded picture block, and the picture 201 may be referred to as a current picture or a to-be-coded picture (particularly in video coding, for distinguishing the current picture from other pictures, for example, previously encoded and/or decoded pictures in a same video sequence, that is, the video sequence that also includes the current picture).

In an embodiment, the encoder 20 may include a partitioning unit (not depicted in FIG. 2), configured to partition the picture 201 into a plurality of blocks such as picture blocks 203. The picture 201 is usually partitioned into a plurality of non-overlapping blocks. The partitioning unit may be configured to: use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although the size of the picture block 203 is smaller than the size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define the size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (other details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is usually scaled by a factor. To preserve a norm of a residual block that is processed by using forward and inverse transforms, applying an additional scale factor is a part of a transform process. The scale factor is usually selected based on some constraints. For example, the scale factor is a power of 2 for a shift operation, a bit depth of the transform coefficient, or a tradeoff between accuracy and implementation costs. For example, a specific scale factor is specified for the inverse transform by, for example, the inverse transform processing unit 212 at the side of the decoder 30 (and a corresponding inverse transform by, for example, the inverse transform processing unit 212 at the side of the encoder 20), and correspondingly, a corresponding scale factor may be specified for the forward transform by the transform processing unit 206 at the side of the encoder 20.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to a part or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An applicable quantization step may be indicated by the QP. For example, the quantization parameter may be an index to a predefined set of applicable quantization steps. For example, a smaller quantization parameter may correspond to finer quantization (a smaller quantization step), and a larger quantization parameter may correspond to coarser quantization (a larger quantization step) or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In an example embodiment, scales of the inverse transform and the dequantization may be combined. In some embodiments, a customized quantization table may be used and signaled from the encoder to the decoder, for example, in a bitstream. The quantization is a lossy operation, where a loss increases with an increasing quantization step.

The inverse quantization unit 210 is configured to apply inverse quantization of the quantization unit 208 to a quantization coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211 and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, a reconstructed residual block 213) to the prediction block 265, for example, by adding a sample value of the reconstructed residual block 213 and a sample value of the prediction block 265, to obtain a reconstructed block 215 in the sample domain.

In some embodiments, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction unit 254 but also used for the loop filter 220 (not shown in FIG. 2), and/or so that, for example, the buffer unit 216 and the decoded picture buffer 230 form one buffer. In other embodiments, a filtered block 221 and/or a block or a sample from the decoded picture buffer 230 (the block or sample is not shown in FIG. 2) are/is used as an input or a basis for the intra prediction unit 254.

The loop filter 220 (or "loop filter" 220 for short) is configured to filter the reconstructed block 215 to obtain the filtered block 221, to smooth pixel transition or improve video quality. The loop filter 220 is intended to represent one or more loop filters, for example, a deblocking filter, a sample-adaptive offset (SAO) filter, or another filter such as a bilateral filter, an adaptive loop filter (ALF), a sharpening or smoothing filter, or a collaborative filter. Although the loop filter 220 is shown as an in-loop filter in FIG. 2, in another configuration, the loop filter 220 may be implemented as a post-loop filter. The filtered block 221 may also be referred to as a filtered reconstructed block 221. The decoded picture buffer 230 may store a reconstructed encoded block after the loop filter 220 performs a filtering operation on the reconstructed encoded block.

In an embodiment, the encoder 20 (correspondingly, the loop filter 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (DPB) 230 may be a reference picture memory that stores reference picture data for use in video data encoding by the encoder 20. The DPB 230 may be formed by any one of a variety of memory devices such as a dynamic random access memory (DRAM) (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, a previously reconstructed and filtered block 221, of a same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the DPB 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230; and is configured to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, to calculate the residual block 205 and reconstruct the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides a minimum signaling overhead (the minimum signaling overhead means better compression for transmission or storage), or considers or balances both. The mode selection unit 262 may be configured to determine the prediction mode based on rate-distortion optimization (RDO), to be specific, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) in an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In some embodiments, a set of inter prediction modes depends on available reference pictures (namely, for example, at least a part of decoded pictures stored in the DBP 230, as described above) and other inter prediction parameters, for example, depends on whether an entire reference picture or only a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, a skip mode and a merge mode. In some embodiments, the set of inter prediction modes may include a skip-based merge with motion vector difference (MMVD) mode or a merge-based MMVD mode in the embodiments of this application. In an example, the intra prediction unit 254 may be configured to perform any combination of inter prediction technologies described below.

In addition to the foregoing prediction modes, a skip mode and/or a direct mode may also be used in the embodiments of this application.

The prediction processing unit 260 may be further configured to partition the picture block 203 into smaller block partitions or subblocks, for example, by iteratively using quadtree (QT) partitioning, binary tree (BT) partitioning, triple tree (TT) partitioning, or any combination thereof, and perform, for example, prediction on each of the block partitions or subblocks. Mode selection includes selection of a tree structure of the partitioned picture block 203 and selection of a prediction mode applied for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and a previously decoded picture 31, or in other words, the current picture and the previously decoded picture 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a position (coordinates X and Y) of the reference block and a position of the current block as an inter prediction parameter. The offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating a prediction block based on a motion/block vector determined through motion estimation (possibly by performing interpolation in sub-pixel precision). Interpolation filtering may generate additional pixel samples from known pixel samples. This potentially increases a quantity of candidate prediction blocks that may be used to code a picture block. Upon receiving a motion vector for a PU of the current picture block, the motion compensation unit 246 may locate a prediction block to which the motion vector points in one reference picture list. The motion compensation unit 246 may further generate syntax elements associated with a block and a video slice, for decoding a picture block of the video slice by the decoder 30.

Specifically, the inter prediction unit 244 may transmit the syntax elements to the entropy encoding unit 270, where the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, a picture block 203 (a current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra-prediction mode for a block, the intra prediction unit 254 is further configured to provide an intra prediction parameter, that is, information indicating the selected intra-prediction mode for the block, to the entropy encoding unit 270. In an example, the intra prediction unit 254 may be configured to perform any combination of intra prediction technologies.

Specifically, the intra prediction unit 254 may transmit syntax elements to the entropy encoding unit 270, where the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or skip applying) an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding methodology or technique) on one or all of the following: the quantized coefficient 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice that is being encoded.

Another structural variant of the video encoder 20 may be configured to encode a video bitstream. For example, a non-transform based encoder 20 may directly quantize a residual signal without the transform processing unit 206 for some blocks or frames. In some embodiments, the encoder 20 may have the quantization unit 208 and the inverse quantization unit 210 that are combined into a single unit.

Specifically, in this embodiment of this application, the encoder 20 may be configured to implement a video picture encoding method described in the following embodiments.

It should be understood that another structural variant of the video encoder 20 may be configured to encode a video bitstream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional, and in a case of lossless compression coding, the transform processing unit 206, the quantization unit 208, the inverse quantization unit 210, and the inverse transform processing unit 212 are optional. It should be understood that, according to different application scenarios, the inter prediction unit 244 and the intra prediction unit 254 may be selectively enabled.

FIG. 3 is a schematic/conceptual block diagram of an example of a decoder 30 for implementing an embodiment of this application. The video decoder 30 is configured to receive encoded picture data (for example, an encoded bitstream) 21 obtained through encoding by, for example, an encoder 20, to obtain a decoded picture 231. In a decoding process, the video decoder 30 receives video data from the video encoder 20, for example, an encoded video bitstream that represents a picture block of an encoded video slice, and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, a quantized coefficient 309 and/or a decoded coding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. A function of the inter prediction unit 344 may be similar to a function of the inter prediction unit 244, and a function of the intra prediction unit 354 may be similar to a function of the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra prediction mode and data that is from a previously decoded block of a current frame or picture. When a video slice is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one reference picture in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate a prediction block for the current video block that is being decoded. In an example of this application, the prediction processing unit 360 determines, by using some received syntax elements, a prediction mode (for example, intra or inter prediction) for encoding the video block of the video slice, an inter prediction slice type (for example, a B slice, a P slice, or a GPB slice), construction information of one or more of the reference picture lists for the slice, a motion vector for each inter encoded video block of the slice, an inter prediction status of each inter encoded video block of the slice, and other information, to decode the video block of the current video slice. In another example of this disclosure, syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient that is provided in the bitstream and that is decoded by the entropy decoding unit 304. An inverse quantization process may include: using a quantization parameter calculated by the video encoder 20 for each video block in the video slice, to determine a degree of quantization that should be applied and, likewise, a degree of inverse quantization that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (that is, a reconstructed residual block 313) to the prediction block 365, for example, by adding a sample value of the reconstructed residual block 313 and a sample value of the prediction block 365, to obtain a reconstructed block 315 in a sample domain.

The loop filter 320 (during a coding loop or after a coding loop) is configured to filter the reconstructed block 315 to obtain a filtered block 321, to smooth pixel transition or improve video quality. In an example, the loop filter 320 may be configured to perform any combination of filtering technologies described below. The loop filter 320 is intended to represent one or more loop filters, for example, a deblocking filter, a sample-adaptive offset (SAO) filter, or another filter such as a bilateral filter, an adaptive loop filter (ALF), a sharpening or smoothing filter, or a collaborative filter. Although the loop filter 320 is shown as an in-loop filter in FIG. 3, in another configuration, the loop filter 320 may be implemented as a post-loop filter.

A decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Another variant of the video decoder 30 may be configured to decode a compressed bitstream. For example, the decoder 30 may generate an output video bitstream without the loop filter 320. For example, anon-transform based decoder 30 may directly inverse-quantize a residual signal without the inverse transform processing unit 312 for some blocks or frames. In some embodiments, the video decoder 30 may have the inverse quantization unit 310 and the inverse transform processing unit 312 that are combined into a single unit.

Specifically, in this embodiment of this application, the decoder 30 is configured to implement a video picture decoding method described in the following embodiments.

It should be understood that another structural variant of the video decoder 30 may be configured to decode an encoded video bitstream. For example, the video decoder 30 may generate an output video bitstream without processing by the filter 320. Alternatively, for some picture blocks or picture frames, the entropy decoding unit 304 of the video decoder 30 does not obtain quantized coefficients through decoding, and correspondingly, processing by the inverse quantization unit 310 and the inverse transform processing unit 312 is not required. The loop filter 320 is optional, and in a case of lossless compression, the inverse quantization unit 310 and the inverse transform processing unit 312 are optional. It should be understood that, according to different application scenarios, the inter prediction unit and the intra prediction unit may be selectively enabled.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of the corresponding procedure.

For example, a motion vector of a control point of a current picture block or a motion vector of a subblock of the current picture block derived from a motion vector of a neighboring affine coding block may be further processed. This is not limited in this application. For example, a value of the motion vector is constrained to be within a specific bit depth range. Assuming that an allowed bit depth of the motion vector is bitDepth, the value of the motion vector ranges from $-2^{\wedge}(\text{bitDepth}-1)$ to $2^{\wedge}(\text{bitDepth}-1)-1$, where the symbol "^" represents exponentiation. If bitDepth is 16, the value ranges from −32768 to 32767. If bitDepth is 18, the value ranges from −131072 to 131071. For another example, the value of the motion vector (for example, motion vectors MVs of four 4×4 subblocks in one 8×8 picture block) is constrained, so that a maximum difference between integer parts of the MVs of the four 4×4 subblocks does not exceed N pixels, for example, not exceed one pixel.

Figure 4:
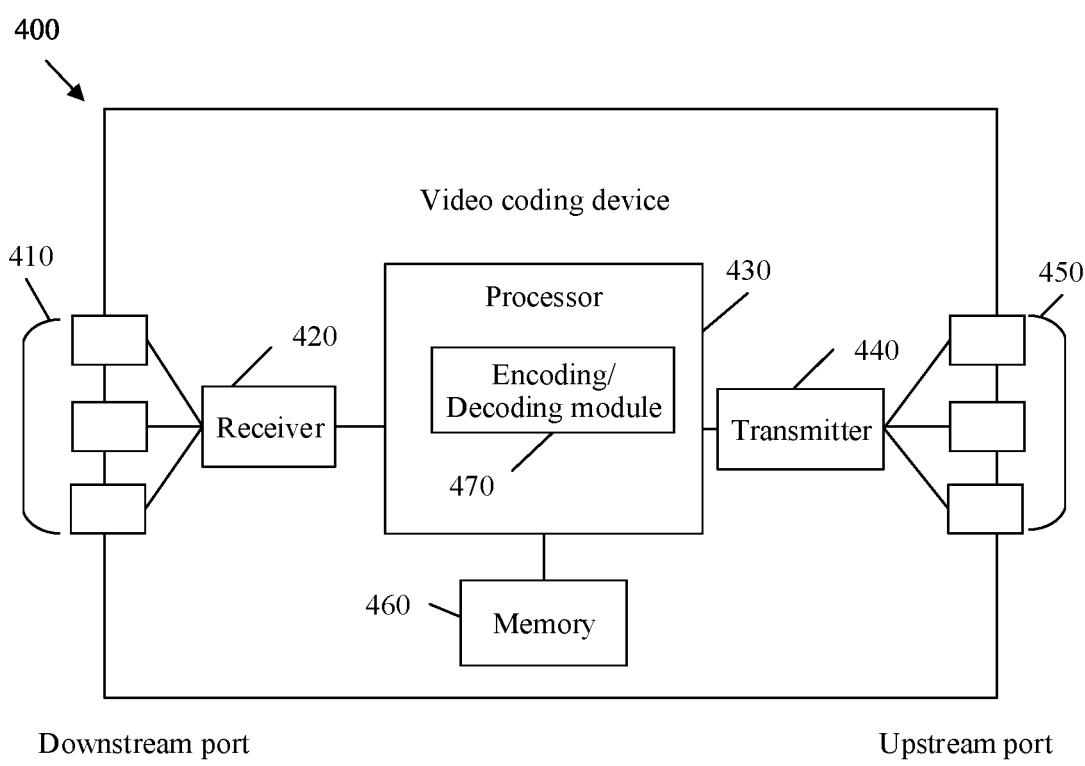
FIG. 4 is a block diagram of an example of a video coding device 400 for implementing an embodiment of this application.

FIG. 4 is a schematic diagram of a structure of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: an ingress port 410 and a receiver unit (Rx) 420 for receiving data; a processor, a logic unit, or a central processing unit (CPU) 430 for processing data; a transmitter unit (Tx) 440 (or briefly referred to as a transmitter 440) and an egress port 450 for transmitting data; and a memory 460 (for example, memory 460) for storing data. The video coding device 400 may further include an optical-to-electrical conversion component and an electrical-to-optical (EO) component that are coupled to the ingress port 410, the receiver unit 420 (or briefly referred to as a receiver 420), the transmitter unit 440, and the egress port 450 for egress or ingress of optical or electrical signals.

The processor 430 is implemented by using hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the QP setting method provided in the embodiments of this application. For example, the encoding/decoding module 470 implements, processes, or provides various coding operations. Therefore, the encoding/decoding module 470 provides a substantial improvement to a function of the video coding device 400 and affects transform of the video coding device 400 to a different state. Alternatively, the encoding/decoding module 470 is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or non-volatile, and may be a read-only memory (ROM), a random access memory (RAM), a ternary content-addressable memory (TCAM), and/or a static random access memory (SRAM).

Figure 5:
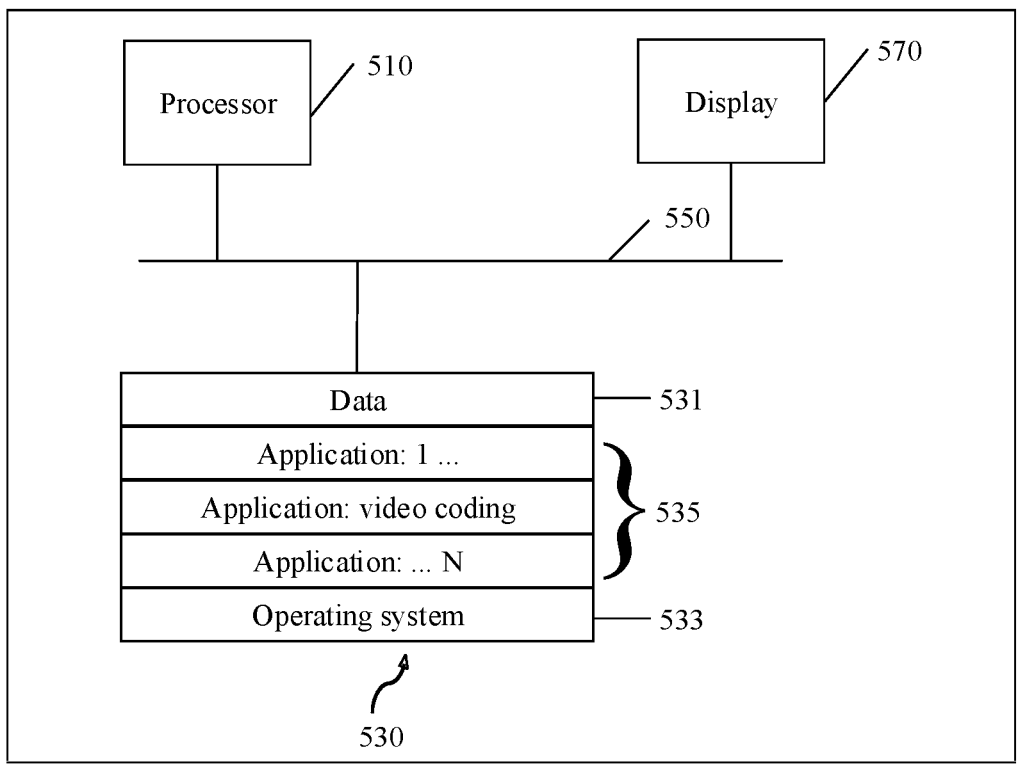
FIG. 5 is a block diagram of another example of an encoding apparatus or a decoding apparatus for implementing an embodiment of this application.

FIG. 5 is a simplified block diagram of an apparatus 500 that may be used as either or both of the source device 12 and the destination device 14 in FIG. 1A according to an example embodiment. The apparatus 500 may implement the technologies of this application. In other words, FIG. 5 is a schematic block diagram of an implementation of an encoding device or a decoding device (a coding device 500 for short) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code, and the processor may invoke the program code stored in the memory to perform various video picture encoding or decoding methods described in this application, especially video encoding or decoding methods in various inter prediction modes or intra prediction modes. To avoid repetition, details are not described herein.

In this embodiment of this application, the processor 510 may be a central processing unit (CPU), or the processor 510 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 530 may include a read-only memory (ROM) device or a random access memory (RAM) device. Any other suitable type of storage device may alternatively be used as the memory 530. The memory 530 may include code and data 531 that are accessed by the processor 510 through the bus 550. The memory 530 may further include an operating system 533 and an application program 535. The application program 535 includes at least one program that allows the processor 510 to perform a video encoding or decoding method (in particular, a video picture prediction method or an inter prediction method described in this application) described in this application. For example, the application program 535 may include applications 1 to N, and further includes a video encoding or decoding application (briefly referred to as a video coding application) that is used to perform the video encoding or decoding method described in this application.

The bus system 550 may further include a power bus, a control bus, a status signal bus, and the like, in addition to a data bus. However, for clear description, various types of buses in the figure are marked as the bus system 550.

In some embodiments, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

CTU is an abbreviation of coding tree unit. A picture includes a plurality of CTUs, and one CTU usually corresponds to one square picture region and includes a luma pixel and a chroma pixel in the picture region (or may include only a luma pixel or only a chroma pixel). The CTU further includes syntax elements, and these syntax elements indicate a method about how to split the CTU into at least one coding unit (CU) and decode each coding unit to obtain a reconstructed picture.

A CU usually corresponds to one A×B rectangular region, and includes A×B luma pixels and chroma pixels corresponding to the luma pixels. A is the width of the rectangle, B is the height of the rectangle, and A and B may be the same or different. Values of A and B each are usually an integer power of 2, for example, 256, 128, 64, 32, 16, 8, or 4. Decoding processing may be performed on a coding unit to obtain a reconstructed picture of an A×B rectangular region. The decoding processing usually includes processing such as prediction, dequantization, and inverse transform, to generate a predicted picture and a residual. The predicted picture and the residual are added to obtain a reconstructed picture.

Figures 6A, 6B, 6C, 6D, 6E:
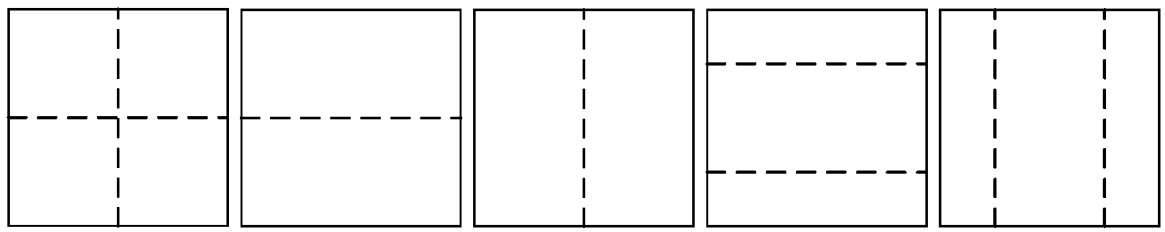
FIG. 6(a), FIG. 6(b), FIG. 6(c), FIG. 6(d), and FIG. 6(e) are schematic diagrams illustrating quadtree split, binary split, and ternary tree split.

A quadtree is a tree structure. One node can be split into four child nodes. In the H.265 video coding standard, a quadtree-based CTU split mode is used. In the quadtree-based CTU split mode, a CTU is used as a root node, and each node corresponds to a square region; and a node may not be split (in this case, a region corresponding to the node is a CU), or the node is split into four lower-level nodes, to be specific, the square region is split into four equal-sized square regions (the length and the width of each of the four equal-sized square regions are half of the length and the width of the square region before split), and each region corresponds to one node, as shown in FIG. 6(a).

A binary tree is a tree structure. One node can be split into two child nodes. In an existing coding method in which the binary tree is used, a node on a binary tree structure may not be split, or the node is split into two lower-level nodes. There are two modes of splitting the node into two nodes: (1) horizontal binary split: A region corresponding to the node is split into two equal-sized regions: an upper region and a lower region, where each region corresponds to one node, as shown in FIG. 6(b); or (2) vertical binary split: A region corresponding to the node is split into two equal-sized regions: a left region and a right region, where each region corresponds to one node, as shown in FIG. 6(c).

A triple tree is a tree structure. One node can be split into three child nodes. In an existing coding method in which the triple tree is used, anode on a triple tree structure may not be split, or the node is split into three lower-level nodes. There are two modes of splitting the node into three nodes: (1) horizontal ternary split: A region corresponding to the node is split into three regions: an upper region, a middle region, and a lower region, where each region corresponds to one node, and the heights of the upper region, the middle region, and the lower region are respectively ¼, ½, and ¼ of the height of the node, as shown in FIG. 6(d); and (2) vertical ternary split: A region corresponding to the node is split into three regions: a left region, a middle region, and a right region, where each region corresponds to one node, and the widths of the left region, the middle region, and the right region are respectively ¼, ½, and ¼ of the width of the node, as shown in FIG. 6(e).

Video decoding is a processing process of restoring a video bitstream to a reconstructed picture according to a syntax rule and a processing method.

Video encoding is a processing process of compressing a picture sequence into a bitstream.

Video coding is an umbrella term for video encoding and video decoding. Video coding and video encoding have a same Chinese translation.

The VVC Test Model (VTM) is new codec reference software developed by the Joint Video Experts Team (JVET).

In the H.265 video coding standard, a frame of picture is partitioned into non-overlapping coding tree units (CTUs). A CTU size may be set to 64×64 (the CTU size may alternatively be set to another value, for example, the CTU size in JVET reference software JEM is increased to 128× 128 or 256×256). A 64×64 CTU includes a rectangular pixel matrix with 64 columns and 64 pixels per column, and each pixel includes a luma component or/and a chroma component.

In H.265, the quadtree (QT)-based CTU split mode is used. A CTU is used as a root node of a quadtree, and the CTU is recursively split into several leaf nodes in the quadtree split mode. One node corresponds to one picture region. If a node is not split, the node is referred to as a leaf node, and a picture region corresponding to the node forms one CU. If a node is further split, a picture region corresponding to the node is split into four equal-sized regions (the length and the width of each of the four regions are respectively half of the length and the width of the split region), and each region corresponds to one node. Whether these nodes are to be further split needs to be separately determined. Whether a node is to be split is signaled by a split flag split_cu_flag that is in a bitstream and that corresponds to the node. A node A is split into four nodes Bi once, where i=0, 1, 2, 3. Bi is referred to as a child node of A, and A is referred to as a parent node of Bi. A quadtree depth (qtDepth) of the root node is 0. A quadtree depth of a node is a quadtree depth of a parent node of the node plus 1. For brevity of description, in the following, the size and the shape of a node are the size and the shape of a picture region corresponding to the node.

More specifically, for a 64×64 CTU node (whose quadtree depth is 0), based on split_cu_flag corresponding to the CTU node, the CTU node may not be split and may be one 64×64 CU, or the CTU node may be split into four 32×32 nodes (whose quadtree depths are 1). Each of the four 32×32 nodes may be further split or not split based on split_cu_flag corresponding to the node. If a 32×32 node is further split, four 16×16 nodes (whose quadtree depths are 2) are generated. The rest may be deduced by analogy, until no node is further split. In this way, one CTU is split into a group of CUs. A minimum CU size is identified in an SPS, for example, 8×8 represents the minimum CU size. In the foregoing recursive split process, if the size of a node is equal to the minimum CU size, the node is not further split by default, and a split flag of the node does not need to be included in the bitstream.

After a node is parsed to be a leaf node, the leaf node is a CU, coding information (including information such as a prediction mode and a transform coefficient of the CU, for example, a coding_unit( ) syntax structure in H.265) corresponding to the CU is further parsed. Then, decoding processing such as prediction, dequantization, inverse transform, and loop filtering is performed on the CU based on the coding information, to generate a reconstructed picture corresponding to the CU. The quadtree structure enables the CTU to be split into a group of CUs of appropriate sizes based on a local picture feature. For example, a smooth region is split into relatively large CUs, and a region with rich textures is split into relatively small CUs.

Based on the quadtree split, a binary tree (BT) split mode and a ternary tree (TT) split mode are added to VTM reference software.

The binary split is to split anode into two child nodes. There are two binary split modes:

(1) Horizontal binary split: A region corresponding to the node is split into two regions of a same size: an upper region and a lower region (e.g., the widths remain unchanged, and the heights are a half of the height of the region before split), where each region corresponds to one node, as shown in FIG. 6(b).

(2) Vertical binary split: A region corresponding to the node is split into two regions of a same size: a left region and a right region (e.g., the heights remain unchanged, and the widths are a half of the width of the region before split), as shown in FIG. 6(c).

The ternary split is to split a node into three child nodes. There are two ternary split modes:

Horizontal ternary split: A region corresponding to the node is split into three regions: an upper region, a middle region, and a lower region, where each region corresponds to one node, and the heights of the upper region, the middle region, and the lower region are respectively ¼, ½, and ¼ of the height of the node, as shown in FIG. 6(d).

Vertical ternary split: A region corresponding to the node is split into three regions: a left region, a middle region, and a right region, where each region corresponds to one node, and the widths of the left region, the middle region, and the right region are respectively ¼, ½, and ¼ of the width of the node, as shown in FIG. 6(e).

In the VTM, a split mode cascading a QT and a BT/TT is used, which is briefly referred to as QT-MTT (Quad Tree plus Multi-Type Tree) split mode. More specifically, a CTU is split by using the QT mode, to generate a QT leaf node. A node in the QT may be further split into four QT child nodes by using the quadtree split mode, or one QT leaf node is generated without using the quadtree split mode. A QT leaf node is used as a root node of an MTT. A node in the MTT may be split into child nodes by using one of the four split modes: horizontal binary split, vertical binary split, horizontal ternary split, and vertical ternary split; or a node in the MTT is one MTT leaf node without being further split. A leaf node of the MTT is a CU.

Figure 7:
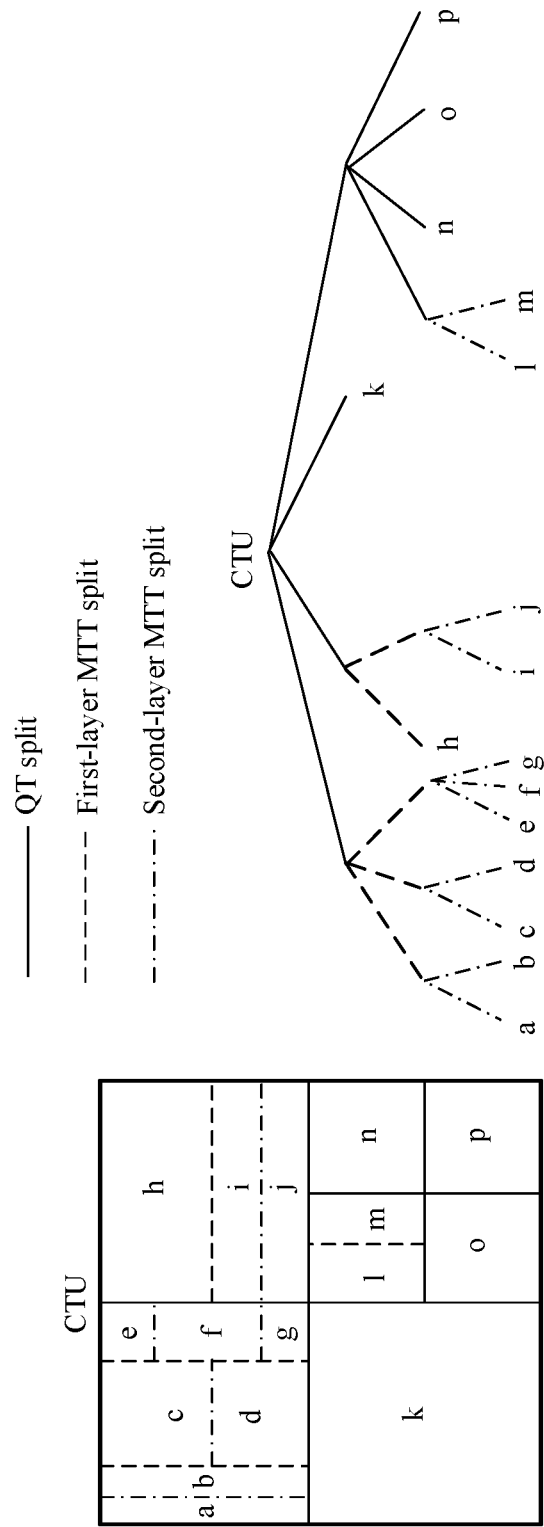
FIG. 7 is a schematic diagram illustrating splitting of a CTU into CUs by using a QT-MTT according to an embodiment.

FIG. 7 shows an example in which a CTU is split into 16 CUs from a to p by using a QT-MTT. In the right part in FIG. 7, each endpoint represents one node. Four lines connected to one node indicate quadtree split, two lines connected to one node indicate binary split, and three lines connected to one node indicate ternary split. A solid line indicates the QT split, a dashed line indicates MTT first-layer split, and a dot-dashed line indicates MTT second-layer split. a to p represent 16 MTT leaf nodes, and each MTT leaf node is one CU. A CU split diagram shown in the left part in FIG. 7 is obtained by splitting a CTU in a split mode shown in the right part in FIG. 7.

In the QT-MTT split mode, each CU has a QT depth (Quad-tree depth) and an MTT depth (Multi-Type Tree depth). The QT depth indicates a QT depth of a QT leaf node to which the CU belongs, and a MTT depth indicates an MTT depth of a MTT leaf node to which the CU belongs. For example, in FIG. 6(a), FIG. 6(b), FIG. 6(c), FIG. 6(d), and FIG. 6(e), a QT depth of a, b, c, d, e, f, g, i, or j is 1, and an MTT depth is 2; a QT depth of h is 1, and an MTT depth is 1; a QT depth of n, o, or p is 2, and an MTT depth is 0; and a QT depth of l or m is 2, and a MTT depth is 1. If a CTU is split into only one CU, a QT depth of the CU is 0, and a MTT depth of the CU is 0.

A quantization step is controlled by using a quantization parameter (QP). In the VVC draft 5, for a YUV4:2:0 format, a CU including a luma block and a chroma block (a luma-chroma CU for short) includes one luma QP and two chroma QPs (that is, the luma block, a Cb chroma block, and a Cr chroma block each have one QP). In a separate tree (separate tree or dual tree), a CU including only a luma block (luma CU for short) and a CU including only a chroma block (chroma CU for short) also exist. In a single tree (single tree), all CUs are luma-chroma CUs, and chroma QPs in these CUs are derived from luma QPs in CUs in which chroma blocks are located. In the separate tree, a chroma QP of the chroma CU is derived from a luma QP of a luma CU corresponding to the center of the chroma CU.

The JVET-O0050 proposal provides a local separate tree method, and the method is used in VTM-6 software. A chroma block of a child node generated by further dividing a coding tree node including a luma block and a chroma block includes less than 16 chroma pixels (for example, the coding tree node includes 64 pixels, and a split mode for the coding tree node is binary split or quadtree split), the coding tree node can be coded into an intra coding region (that is, in VTM6, modeType of the coding tree node is MODE_TYPE_INTRA), the luma block in the coding tree node is further divided, to generate a plurality of luma nodes, and the chroma block in the coding tree node is not further divided, and therefore there is one chroma node. Therefore, the coding tree node generates a local separate tree.

A luma QP is obtained based on a predictive QP and a delta QP. A quantization group (QG) includes one or more CUs, and a size range of the quantization group is specified by a syntax element (for example, cu_qp_delta_subdiv in VVC) in a PPS. If none of CUs in a quantization group has a residual, QPs of all the CUs in the quantization group are a predictive QP. Otherwise, a delta QP may be signaled at a first CU having a residual in a decoding order of a luma-chroma CU and a luma CU in the quantization group, that is, the delta QP is not allowed to be signaled at a chroma CU. A predictive QP of the quantization group is obtained based on joint prediction of a QP of a left CU in the quantization group, a QP of an upper CU in the quantization group, and a QP of a previous quantization group. A luma QP of a CU encoded before a CU in which the delta QP is located is the predictive QP, and luma QPs of remaining CUs in the quantization group are a sum of the predictive QP and the delta QP.

A main process of deriving a chroma QP based on a luma QP and a chroma QP offset is as follows:

searching a chroma QP mapping table (for example, ChromaQpTable in the VVC draft 6) based on a luma QP corresponding to a chroma block, to obtain a first chroma QP value (for example, qPCb in the VVC draft 6); and adding the first chroma QP value and the chroma QP offset to obtain the chroma QP, where the chroma QP offset is a sum of a PPS-level chroma QP offset (for example, pps_cb_qp_offset and pps_cr_qp_offset in VVC), a slice-level chroma offset (for example, slice_cb_qp_offset and slice_cr_qp_offset in VVC), or a CU-level chroma QP offset (for example, CuQpOffsetCb in VVC).

For brevity and to distinguish from the chroma QP, the luma QP corresponding to the chroma block is referred to as a chroma basic QP. In addition, a basic QP of a CU is defined as follows:

for a luma CU, a luma QP in the CU is a basic QP of the CU;

for a chroma CU, a chroma basic QP in the CU is a basic QP of the CU; or for a luma-chroma CU, a luma QP in the CU is a basic QP of the CU, and a chroma basic QP in the CU is equal to the luma QP.

One QG includes N CUs, denoted as CUi (i=0, 1, . . . , N−1), where i represents a coding order of these CUs, and N is a positive integer. In a local separate tree, the N CUs may include a luma-chroma CU, a luma CU, and a chroma CU, where the luma-chroma CU includes a luma block and a chroma block, the luma CU includes only a luma block, and the chroma CU includes only a chroma block.

In VTM-6rc1 software, an encoder side sets a QP of a CU in the following manner:

setting a basic QP of each CU in the QG to a target QP, where the predictive QP of the QG may be different from the target QP;

sequentially encoding CUs in the QG;

checking whether each CU in the QG has a residual, for example, determining whether the CU has a residual by checking a cbf (coded block flag) of each transform block in the CU or root_cbf of the CU; and resetting a QP value of the CU in the QG, where specifically, if none of the CUs in the QG has a residual, the basic QP of each CU is modified to the predictive QP; otherwise (e.g., if at least one CU in the QG has a residual), a first CU having a residual in the QG is found and is denoted as CUf, and a basic QP of a CU encoded before the CUf in the QG is modified to the predictive QP.

In the local separate tree, when an encoder in VTM6rc1 uses the foregoing QP setting method, a basic QP of a chroma CU in an encoding process does not match a basic QP of the chroma CU obtained through decoding.

For example, when the first CU having a residual in the QG is a chroma CU, according to a QP modification method at the encoder side in VTM6rc1, a basic QP of a CU before the chroma CU is set to a predictive QP, and a basic QP of the chroma CU and a basic QP of a CU after the chroma CU are set to a target QP (for example, a sum of the predictive QP and a delta QP). The VVC standard (for example, the VVC draft 6) specifies that the delta QP cannot be signaled at the chroma CU. During decoding, the basic QP of the chroma CU is set to the predictive QP. Consequently, the basic QP of the chroma CU is inconsistent in encoding and decoding processing. As a result, encoder-decoder mismatch occurs. In addition, during decoding, basic QPs of all CUs after the chroma CU and before a first luma CU or luma-chroma CU having a residual are also set to the predictive QP. However, according to the QP modification method at the encoder side in VTM6rc1, the basic QPs of these CUs are not modified to the predictive QP, and therefore the basic QPs are all the target QP. This also causes inconsistency in encoding and decoding of the basic QPs of these CUs.

For another example, one QG is a root node of one local separate tree, the local separate tree includes three luma CUs and one chroma CU, the first two luma CUs have no residual, the third luma CU has a residual, and the chroma CU has a residual. Therefore, the delta QP is signaled at the third luma CU. In this case, according to the QP modification method at the encoder side in VTM6rc1, basic QPs of the first two luma CUs are set to the predictive QP, and a basic QP of the third luma CU and a basic QP of the chroma CU are not modified, and are still the target QP. However, a decoder side sets the basic QPs of the first two luma CUs to the predictive QP of the QG, sets the basic QP of the third luma CU to the target QP, and sets the basic QP of the chroma CU to a luma QP of the second luma CU (because the second luma CU covers a central position of the chroma CU, the second luma CU is a luma CU corresponding to the chroma CU), that is, to the predictive QP. Therefore, there is also a problem that the basic QP of the chroma CU is inconsistent in encoding and decoding processing.

The present disclosure provides a method for setting, in a local separate tree, a basic QP of a CU for encoding, so that a basic QP set by an encoder side matches a basic QP obtained through decoding by a decoder side.

The present disclosure is applied to a video codec, for example, may be a coding unit QP setting module. The coding unit QP setting module may be specifically disposed in the quantization unit 208 or the inverse quantization unit 210.

An embodiment of the present disclosure relates to a method for setting a basic QP of a CU and a method for encoding a quantization group (QG) in video decoding. For example, the embodiment may be applied to a case in which a predictive QP of a QG is different from a target QP.

A current coding QG includes N CUs, denoted as CUi (i=0, 1, . . . , N−1). The N CUs include at least a luma CU and a chroma CU, and may further include a luma-chroma CU.

Operation 1: Sequentially encode the CUs in the current coding QG, and perform the following processing in an encoding process:

If the CUi is a luma CU or a luma-chroma CU, operation 1.1 and operation 1.2 are performed. If the CUi is a chroma CU, operation 1.3 is performed.

Operation 1.1: Set a basic QP of the CUi to a target QP, and perform encoding processing on the CUi based on the basic QP of the CUi.

Operation 1.2: If the CUi has no residual and both a luma CU and a luma-chroma CU that are encoded before the CUi in the current QG has no residual, modify the basic QP of the CUi to a predictive QP of the current QG.

Operation 1.3: Set a basic QP of the CUi to a basic QP of a luma CU corresponding to a preset position of the CUi, and perform encoding processing on the CUi based on the basic QP of the CUi.

The preset position is, for example, a central position of the CUi, or may be a bottom-right corner position of the CUi. This is not limited in the present disclosure.

The encoding processing on the CUi includes: performing transform and quantization processing on a residual block in the CUi based on the basic QP of the CUi, to obtain quantized transform coefficients, and further includes: performing dequantization and inverse transform processing on the quantized transform coefficients (for example, when a non-zero transform coefficient exists in the quantized transform coefficients), to obtain a reconstructed residual. For a chroma residual block in the CUi, a chroma QP further needs to be derived based on the basic QP and a QP offset, and transform and quantization processing is performed on the residual based on the chroma QP.

Whether a CU has a residual may be determined by determining whether cbfs of all transform blocks in the CU are all 0. If the cbfs of all the transform blocks are all 0, the CU has no residual. Otherwise, the CU has a residual. Alternatively, whether a CU has a residual may be determined based on a root_cbf variable of the CU. This is the conventional technology. For example, reference is made to processing in VTM6rc1.

It should be noted that, when a chroma CU is encoded, a chroma QP of the chroma CU is derived based on a basic QP and a chroma QP offset. This is the conventional technology. Reference may be made to related processing in HEVC or VVC.

It should be noted that this method may be used when the predictive QP and the target QP are different.

In comparison with the conventional technology, in this embodiment, an encoder side correctly sets a basic QP of each CU, so that the basic QP is the same as a basic QP result obtained through decoding by a decoder side. This ensures consistency between the encoder side and the decoder side.

In a process of deriving the predictive QP of the current QG, a QP of a previous QG is used. The present disclosure further provides a manner of obtaining the QP of the previous QG. The manner is as follows:

If the last CU in the previous QG is a chroma CU, a basic QP of the penultimate CU in the previous QG (the penultimate CU is the last luma CU in the previous QG) is used as the QP of the previous QG. Otherwise, a basic QP of the last CU in the previous QG (the last CU is the last luma-chroma CU in the previous QG) is used as the QP of the previous QG.

Another embodiment of the present disclosure relates to a method for setting a basic QP of a CU and a method for encoding a QG in video decoding.

A current coding QG includes N CUs, denoted as CUi (i=0, 1, ..., N−1). The N CUs include at least a luma CU and a chroma CU, and may further include a luma-chroma CU.

Operation 0: For the current coding QG, set a first parameter, for example, a variable IsCuQpDeltaCoded, to a first value, where the first value is, for example, 0.

Operation 1: Sequentially encode the CUs in the QG, and perform the following processing in an encoding process:

If the CUi is a luma CU or a luma-chroma CU, operation 1.1 and operation 1.2 are performed. If the CUi is a chroma CU, operation 1.3 is performed.

Operation 1.1: Set a basic QP of the CUi to a target QP, and encode the CUi based on the basic QP of the CUi.

Operation 1.2: If the CUi has no residual and IsCuQpDeltaCoded is 0, modify the basic QP of the CUi to a predictive QP of the QG. If the CUi has a residual and IsCuQpDeltaCoded is 0, set IsCuQpDeltaCoded to a second value, for example, 1. In this case, the basic QP of the CUi is not modified, that is, the basic QP of the CUi is kept as the target QP. It should be noted that, if the CUi has a residual and IsCuQpDeltaCoded is 1, the basic QP of the CUi is not modified, that is, the basic QP of the CUi is kept as the target QP.

Operation 1.3: Set a basic QP of the CUi to a basic QP of a luma CU corresponding to a preset position of the CUi, and perform encoding processing on the CUi based on the basic QP of the CUi.

Another embodiment of the present disclosure relates to a method for setting a basic QP of a CU and a method for encoding a QG in video decoding.

A current coding QG includes N CUs, denoted as CUi (i=0, 1, ..., N−1). The N CUs include at least a luma CU and a chroma CU, and may further include a luma-chroma CU.

Operation 1: Sequentially encode the CUs in the current coding QG, and perform the following processing in an encoding process:

If the CUi is a luma-chroma CU, operation 1.1 is performed. If the CUi is a luma CU, operation 1.1 and operation 1.2 are performed.

Operation 1.1: Set a basic QP of the CUi to a target QP, and perform encoding processing on the CUi based on the basic QP of the CUi.

Operation 1.2: If the CUi has no residual and both a luma CU and a luma-chroma CU that are encoded before the CUi in the current QG has no residual, modify the basic QP of the CUi to a predictive QP of the current QG.

If the CUi is a chroma CU, operation 1.3 is performed.

Operation 1.3: Set a basic QP of the CUi to a basic QP of a luma CU corresponding to a preset position of the CUi, and perform encoding processing on the CUi based on the basic QP of the CUi.

Operation 2: After all the N CUs in the current QG are encoded, determine, in a coding order, a first luma CU or luma-chroma CU having a residual in the N CUs in the current QG; and set basic QPs of a luma CU and a luma-chroma CU that are encoded before the first luma CU or luma-chroma CU having a residual in the current QG to the predictive QP.

It should be noted that operation 2 may alternatively be replaced with the following operation: finding, in a coding order, a first luma CU or luma-chroma CU having a residual in the N CUs in the current QG; and setting a basic QP of a luma-chroma CU that is encoded before the first luma CU or luma-chroma CU having a residual in the current QG to the predictive QP.

According to this embodiment of the present disclosure, an encoder side correctly sets a basic QP of each CU, so that the basic QP is the same as a basic QP result obtained through decoding by a decoder side. This ensures consistency between the encoder side and the decoder side.

Another embodiment of the present disclosure relates to a method for setting a basic QP of a CU and a method for encoding a QG in video decoding.

A current coding QG includes N CUs, denoted as CUi (i=0, 1, ..., N−1). The N CUs include at least a luma CU and a chroma CU, and may further include a luma-chroma CU.

Operation 1: Sequentially encode the CUs in the current coding QG, and perform the following processing in an encoding process:

If the CUi is a luma-chroma CU or a luma CU, operation 1.1 is performed.

Operation 1.1: Set a basic QP of the CUi to a target QP, and perform encoding processing on the CUi based on the basic QP of the CUi.

If the CUi is a chroma CU, operation 1.2* and operation 1.3 are performed.

Operation 1.2*: For at least one luma CUk (k<i) in a coverage region of the CUi, if the CUk has no residual and both a luma CU and a luma-chroma CU that are encoded before the CUk in the current QG has no residual, modify a basic QP of the CUk to a predictive QP of the current QG. The at least one luma CUk in the coverage region of the CUi includes a luma CU corresponding to a preset position of the CUi, or may include all luma CUs in the coverage region of the CUi.

Operation 1.3: Set a basic QP of the CUi to a basic QP of the luma CU corresponding to the preset position of the CUi, and perform encoding processing on the CUi based on the basic QP of the CUi.

Operation 2: After all the N CUs in the current QG are encoded, determine, in a coding order, a first luma CU or luma-chroma CU having a residual in the N CUs in the current QG; and set basic QPs of a luma CU and a luma-chroma CU that are encoded before the first luma CU or luma-chroma CU having a residual in the current QG to the predictive QP.

It should be noted that operation 2 may alternatively be replaced with the following operation: finding, in a coding order, a first luma CU or luma-chroma CU having a residual in the N CUs in the current QG; and setting a basic QP of a luma-chroma CU that is encoded before the first luma CU or luma-chroma CU having a residual in the current QG to the predictive QP.

According to this embodiment of the present disclosure, an encoder side correctly sets a basic QP of each CU, so that the basic QP is the same as a basic QP result obtained through decoding by a decoder side. This ensures consistency between the encoder side and the decoder side.

In this embodiment of the present disclosure, the performing encoding processing on the CUi based on the basic QP of the CUi may include: performing quantization processing on a transform coefficient obtained by transforming a residual of the CUi (quantization processing on the CUi for short), to obtain a quantized transform coefficient; and further include: performing dequantization processing (or inverse quantization processing) on the quantized transform coefficient of the CUi (dequantization processing on the CUi for short), to obtain a dequantized transform coefficient.

Figure 8:
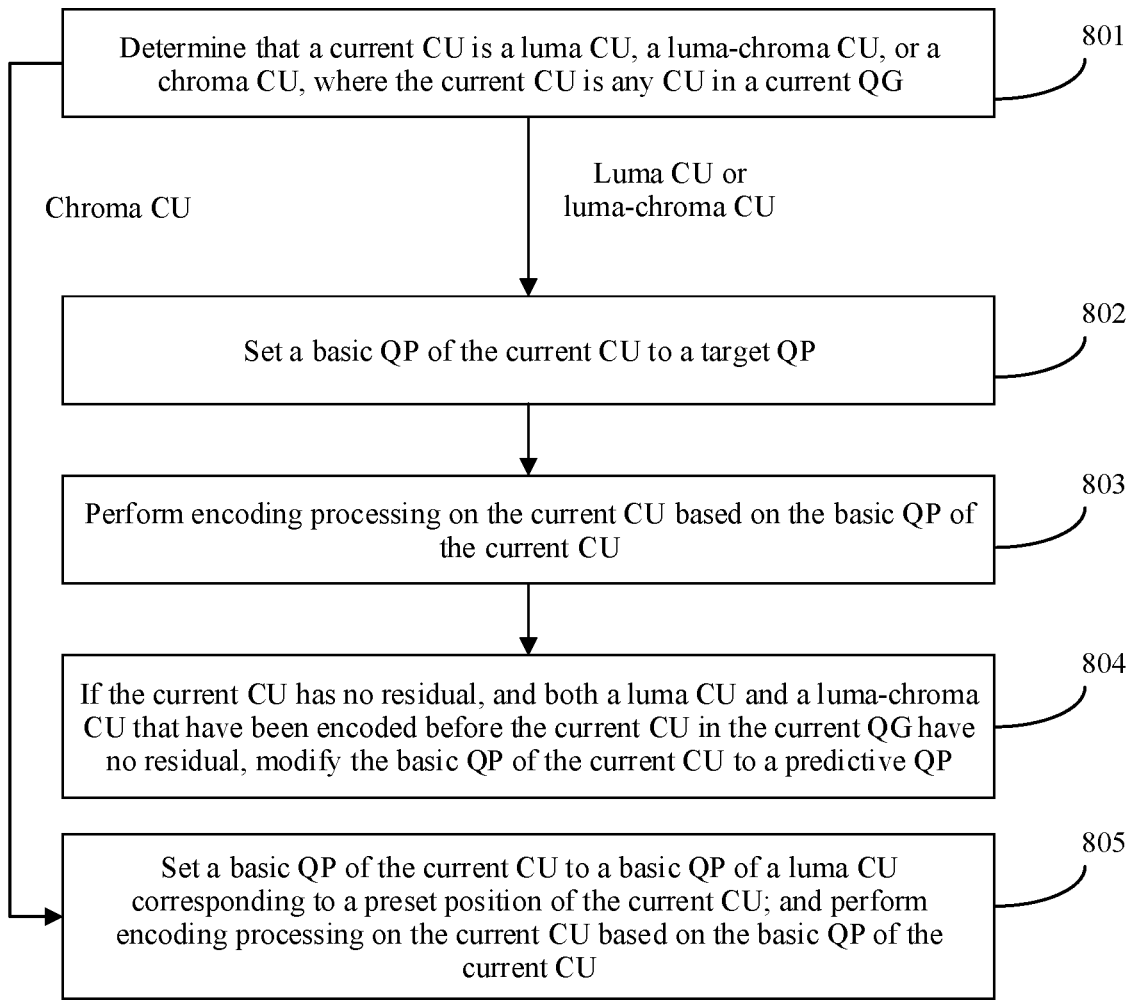
FIG. 8 is a flowchart of a QP setting method according to an embodiment of the present disclosure.

FIG. 8 shows a procedure of a QP setting method according to an embodiment of the present disclosure. The procedure may be applied to a video picture encoding process. As shown in FIG. 8, the method includes the following operations.

801: Determine that a current CU is a luma CU, a luma-chroma CU, or a chroma CU, where the current CU is any CU in a current QG. If the current CU is a luma CU or a luma-chroma CU, operation 802 is performed. If the current CU is a chroma CU, operation 805 is performed.

802: Set a basic QP of the current CU to a target QP.

803: Perform encoding processing on the current CU based on the basic QP of the current CU.

804: If the current CU has no residual, and both a luma CU and a luma-chroma CU that have been encoded before the current CU in the current QG have no residual, modify the basic QP of the current CU to a predictive QP. Otherwise, if the current CU has a residual, or at least one CU of a luma CU and a luma-chroma CU that have been encoded before the current CU in the current QG has a residual, the basic QP of the current CU is not modified.

805: Set a basic QP of the current CU to a basic QP of a luma CU corresponding to a preset position of the current CU; and perform encoding processing on the current CU based on the basic QP of the current CU.

Figure 9:
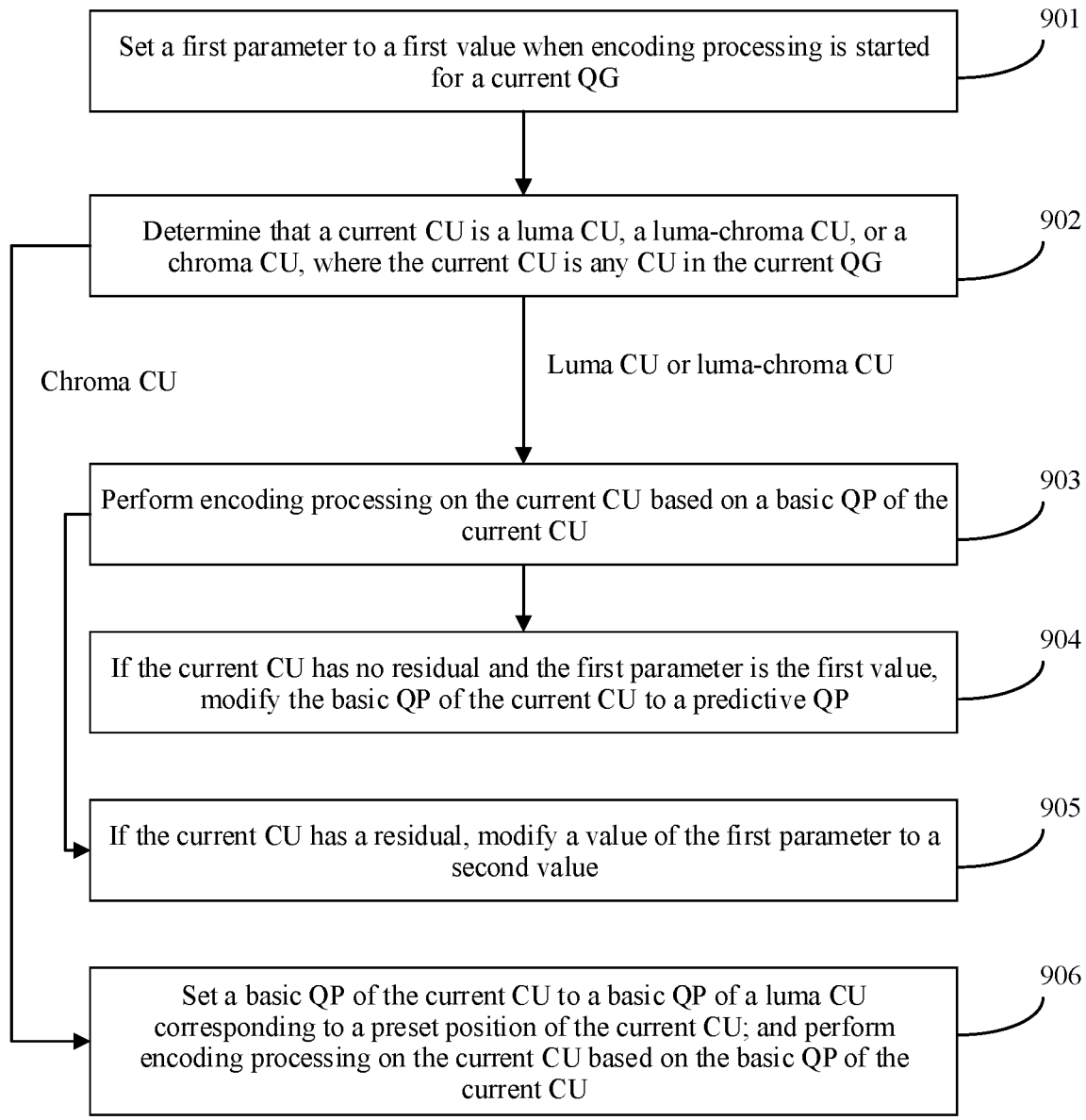
FIG. 9 is a flowchart of a QP setting method according to another embodiment of the present disclosure.

FIG. 9 shows a procedure of a QP setting method according to another embodiment of the present disclosure. The procedure may be applied to a video picture encoding process. As shown in FIG. 9, the method includes the following operations.

901: Set a first parameter to a first value when encoding processing is started for a current QG.

902: Determine that a current CU is a luma CU, a luma-chroma CU, or a chroma CU, where the current CU is any CU in the current QG. If the current CU is a luma CU or a luma-chroma CU, operation 903 is performed. If the current CU is a chroma CU, operation 906 is performed.

903: Perform encoding processing on the current CU based on a basic QP of the current CU. Then, operation 904 or operation 905 is performed.

904: If the current CU has no residual and the first parameter is the first value, modify the basic QP of the current CU to a predictive QP. Otherwise, if the current CU has no residual, but the first parameter is a second value, the basic QP of the current CU does not need to be modified to the predictive QP.

905: If the current CU has a residual, modify a value of the first parameter to the second value.

906: Set a basic QP of the current CU to a basic QP of a luma CU corresponding to a preset position of the current CU; and perform encoding processing on the current CU based on the basic QP of the current CU.

Figure 10:
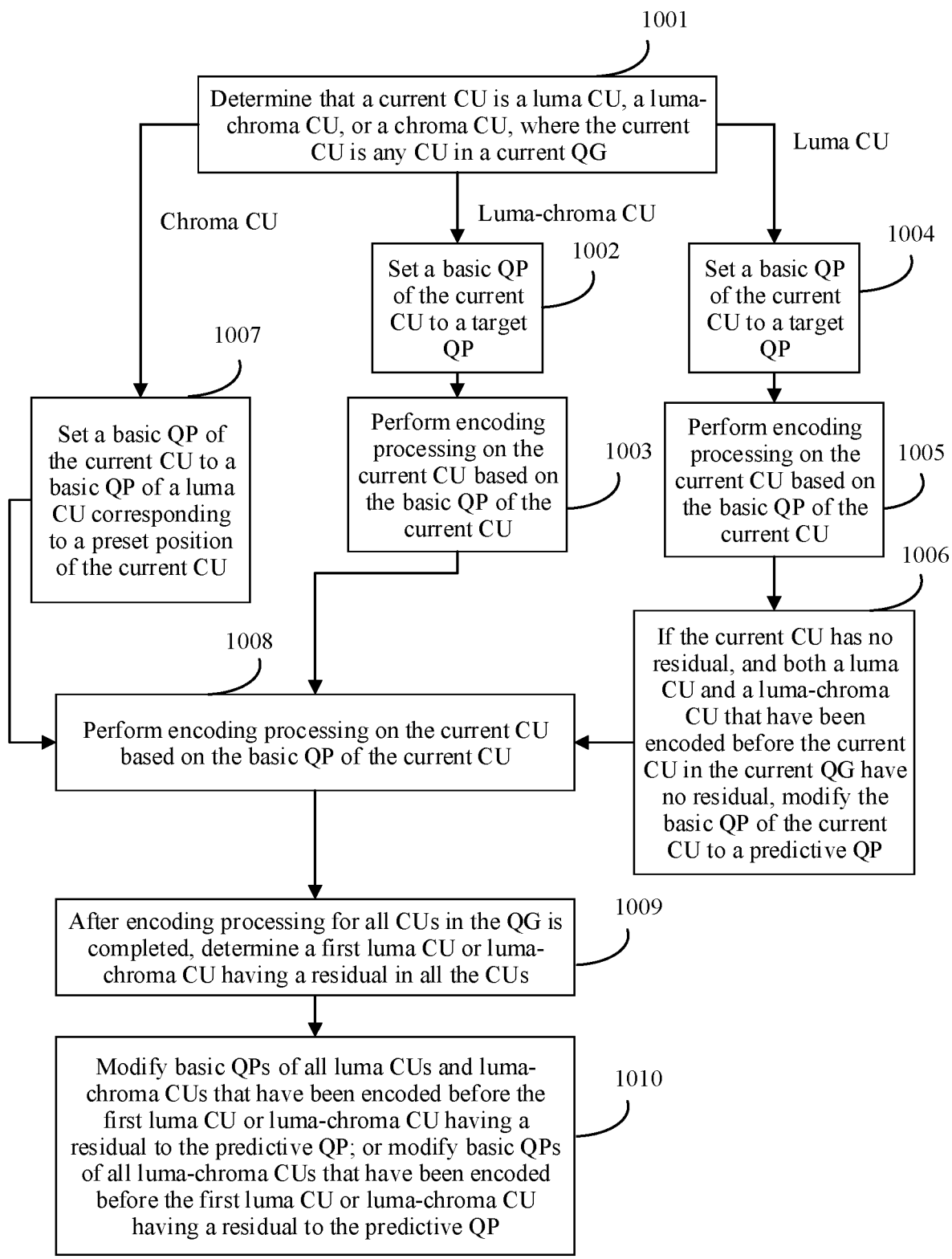
FIG. 10 is a flowchart of a QP setting method according to another embodiment of the present disclosure.

FIG. 10 shows a procedure of a QP setting method according to another embodiment of the present disclosure. The procedure may be applied to a video picture encoding process. As shown in FIG. 10, the method includes the following operations.

1001: Determine that a current CU is a luma CU, a luma-chroma CU, or a chroma CU, where the current CU is any CU in a current QG. If the current CU is a luma-chroma CU, operation 1002 is performed. If the current CU is a luma CU, operation 1004 is performed. If the current CU is a chroma CU, operation 1007 is performed.

1002: Set a basic QP of the current CU to a target QP.

1003: Perform encoding processing on the current CU based on the basic QP of the current CU.

1004: Set a basic QP of the current CU to a target QP.

1005: Perform encoding processing on the current CU based on the basic QP of the current CU.

1006: If the current CU has no residual, and both a luma CU and a luma-chroma CU that have been encoded before the current CU in the current QG have no residual, modify the basic QP of the current CU to a predictive QP. Otherwise, if the current CU has a residual, or at least one CU of a luma CU and a luma-chroma CU that have been encoded before the current CU in the current QG has a residual, the basic QP of the current CU does not need to be modified to the predictive QP.

1007: Set a basic QP of the current CU to a basic QP of a luma CU corresponding to a preset position of the current CU.

1008: Perform encoding processing on the current CU based on the basic QP of the current CU.

1009: After encoding processing for all CUs in the QG is completed, determine a first luma CU or luma-chroma CU having a residual in all the CUs.

1010: Modify basic QPs of all luma CUs and luma-chroma CUs that have been encoded before the first luma CU or luma-chroma CU having a residual to the predictive QP; or modify basic QPs of all luma-chroma CUs that have been encoded before the first luma CU or luma-chroma CU having a residual to the predictive QP.

Figure 11:
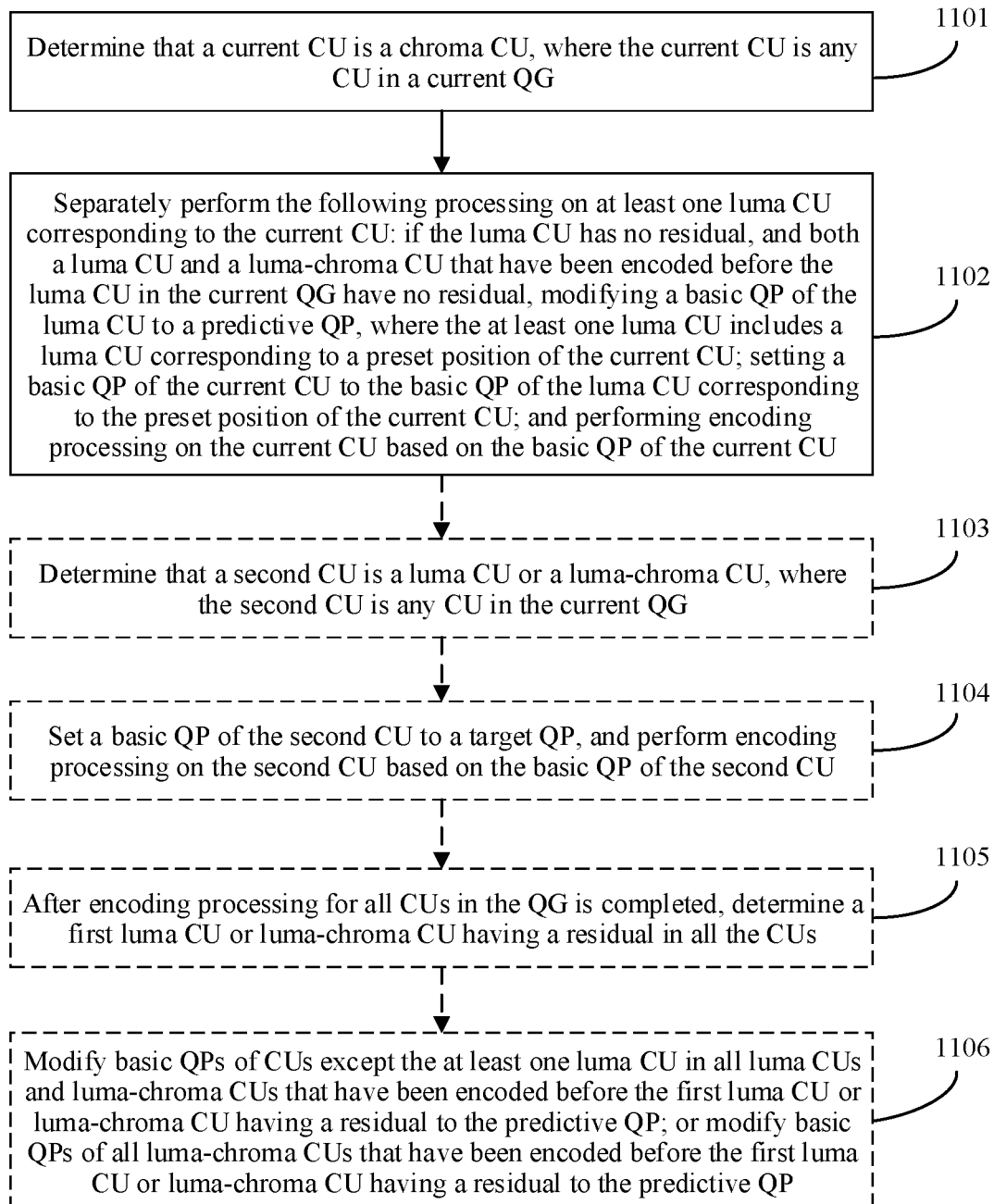
FIG. 11 is a flowchart of a QP setting method according to another embodiment of the present disclosure.

FIG. 11 shows a procedure of a QP setting method according to another embodiment of the present disclosure. The procedure may be applied to a video picture encoding process. As shown in FIG. 11, the method includes the following operations.

1101: Determine that a current CU is a chroma CU, where the current CU is any CU in a current QG.

1102: Separately perform the following processing on at least one luma CU corresponding to the current CU: if the luma CU has no residual, and both a luma CU and a luma-chroma CU that have been encoded before the luma CU in the current QG have no residual, modifying a basic QP of the luma CU to a predictive QP, where the at least one luma CU includes a luma CU corresponding to a preset position of the current CU; setting a basic QP of the current CU to the basic QP of the luma CU corresponding to the preset position of the current CU; and performing encoding processing on the current CU based on the basic QP of the current CU.

In some embodiments, the method may further include the following operations.

1103: Determine that a second CU is a luma CU or a luma-chroma CU, where the second CU is any CU in the current QG.

1104: Set a basic QP of the second CU to a target QP, and perform encoding processing on the second CU based on the basic QP of the second CU.

In some embodiments, the method may further include the following operations.

1105: After encoding processing for all CUs in the QG is completed, determine a first luma CU or luma-chroma CU having a residual in all the CUs.

1106: Modify basic QPs of CUs except the at least one luma CU in all luma CUs and luma-chroma CUs that have been encoded before the first luma CU or luma-chroma CU having a residual to the predictive QP; or modify basic QPs of all luma-chroma CUs that have been encoded before the first luma CU or luma-chroma CU having a residual to the predictive QP.

The video encoding method shown in FIG. 8 to FIG. 11 may be performed by the quantization unit 208 in FIG. 2, the inverse quantization unit 210 in FIG. 2, or the inverse quantization unit 310 in FIG. 3. It may be understood that the QP setting method shown in FIG. 8 to FIG. 11 may alternatively be performed by a module or a unit newly added on the basis of FIG. 2 or FIG. 3.

Figure 12:
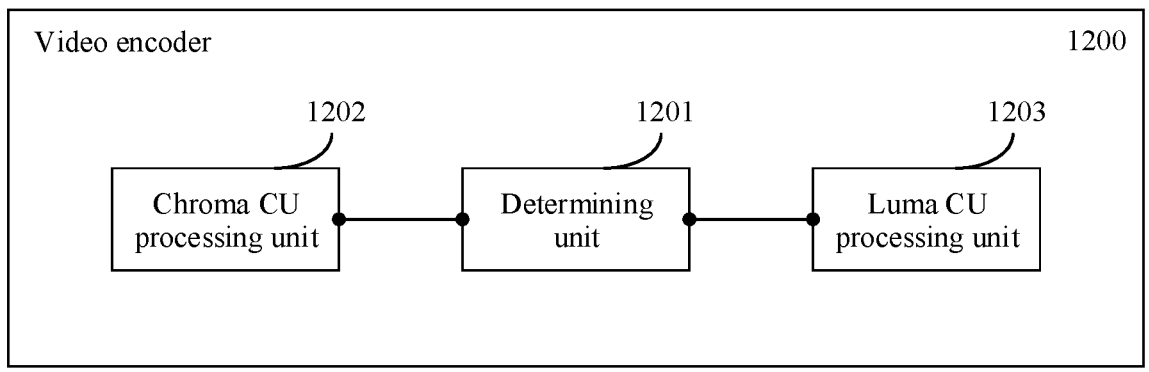
FIG. 12 is a diagram of a structure of a video encoder according to an embodiment of the present disclosure.

FIG. 12 shows a structure of a video encoder 1200 according to an embodiment of this application. The video encoder 1200 includes:

a determining unit 1201, configured to determine that a current CU is a luma CU, a luma-chroma CU, or a chroma CU, where the current CU is any CU in a current QG;

a luma CU processing unit 1202, configured to: when the current CU is a luma CU or a luma-chroma CU, set a basic QP of the current CU to a target QP; perform encoding processing on the current CU based on the basic QP of the current CU; and if the current CU has no residual, and both a luma CU and a luma-chroma CU that have been encoded before the current CU in the current QG have no residual, modify the basic QP of the current CU to a predictive QP; and a chroma CU processing unit 1203, configured to: when the current CU is a chroma CU, set a basic QP of the current CU to a basic QP of a luma CU corresponding to a preset position of the current CU; and perform encoding processing on the current CU based on the basic QP of the current CU.

Figure 13:
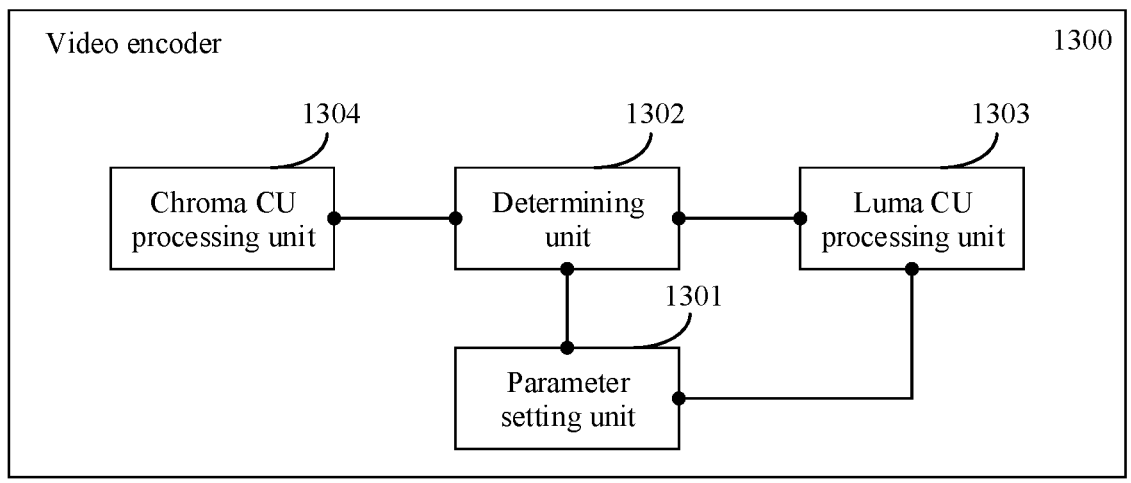
FIG. 13 is a diagram of a structure of a video encoder according to another embodiment of the present disclosure.

FIG. 13 shows a structure of a video encoder 1300 according to another embodiment of this application. The video encoder 1300 includes:

a parameter setting unit 1301, configured to set a first parameter to a first value when encoding processing is started for a current QG;

a determining unit 1302, configured to determine that a current CU is a luma CU, a luma-chroma CU, or a chroma CU, where the current CU is any CU in the current QG;

a luma CU processing unit 1303, configured to: when the current CU is a luma CU or a luma-chroma CU, set a basic QP of the current CU to a target QP; perform encoding processing on the current CU based on the basic QP of the current CU; and if the current CU has no residual and the first parameter is the first value, modify the basic QP of the current CU to a predictive QP; or if the current CU has a residual, trigger the parameter setting unit 1301 to modify a value of the first parameter to a second value, where the second value is different from the first value; and a chroma CU processing unit 1304, configured to: when the current CU is a chroma CU, set a basic QP of the current CU to a basic QP of a luma CU corresponding to a preset position of the current CU; and perform encoding processing on the current CU based on the basic QP of the current CU.

Figure 14:
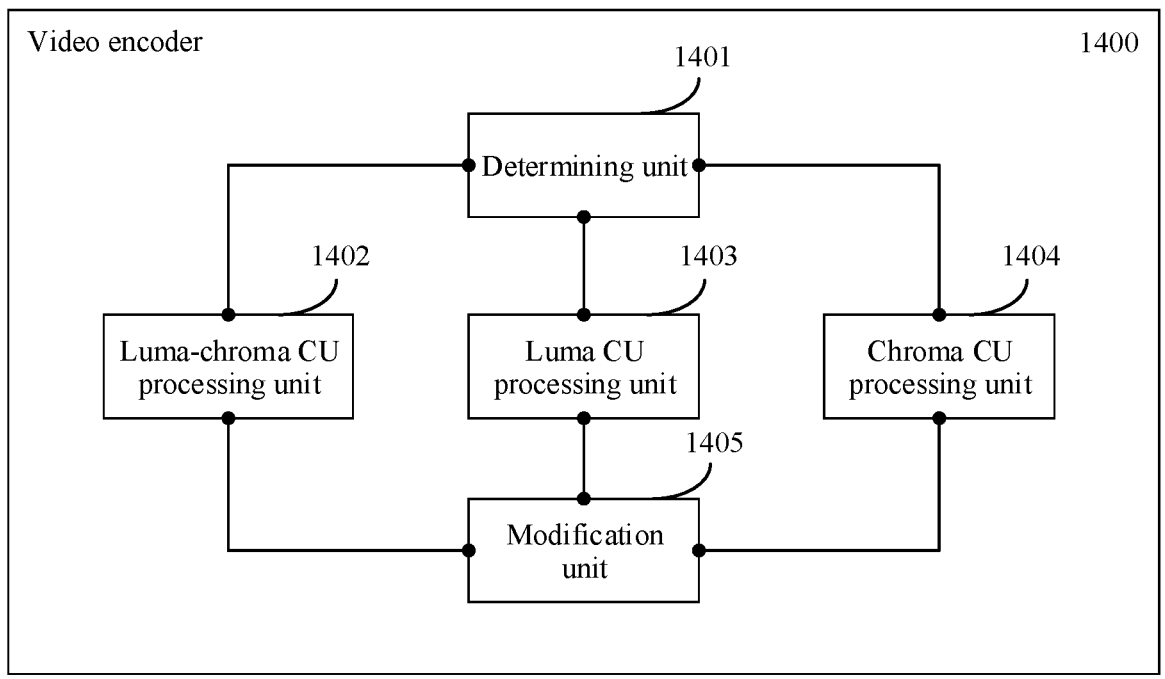
FIG. 14 is a diagram of a structure of a video encoder according to another embodiment of the present disclosure.

FIG. 14 shows a structure of a video encoder 1400 according to another embodiment of this application. The video encoder 1400 includes:

a determining unit 1401, configured to determine that a current CU is a luma CU, a luma-chroma CU, or a chroma CU, where the current CU is any CU in a current QG;

a luma-chroma CU processing unit 1402, configured to: when the current CU is a luma-chroma CU, set a basic QP of the current CU to a target QP; and perform encoding processing on the current CU based on the basic QP of the current CU;

a luma CU processing unit 1403, configured to: when the current CU is a luma CU, set a basic QP of the current CU to a target QP; perform encoding processing on the current CU based on the basic QP of the current CU; and if the current CU has no residual, and both a luma CU and a luma-chroma CU that have been encoded before the current CU in the current QG have no residual, modify the basic QP of the current CU to a predictive QP;

a chroma CU processing unit 1404, configured to: when the current CU is a chroma CU, set a basic QP of the current CU to a basic QP of a luma CU corresponding to a preset position of the current CU; and perform encoding processing on the current CU based on the basic QP of the current CU; and a modification unit 1405, configured to: after encoding processing for all CUs in the QG is completed, determine a first luma CU or luma-chroma CU having a residual in all the CUs; and modify basic QPs of all luma CUs and luma-chroma CUs that have been encoded before the first luma CU or luma-chroma CU having a residual to the predictive QP; or modify basic QPs of all luma-chroma CUs that have been encoded before the first luma CU or luma-chroma CU having a residual to the predictive QP.

Figure 15:
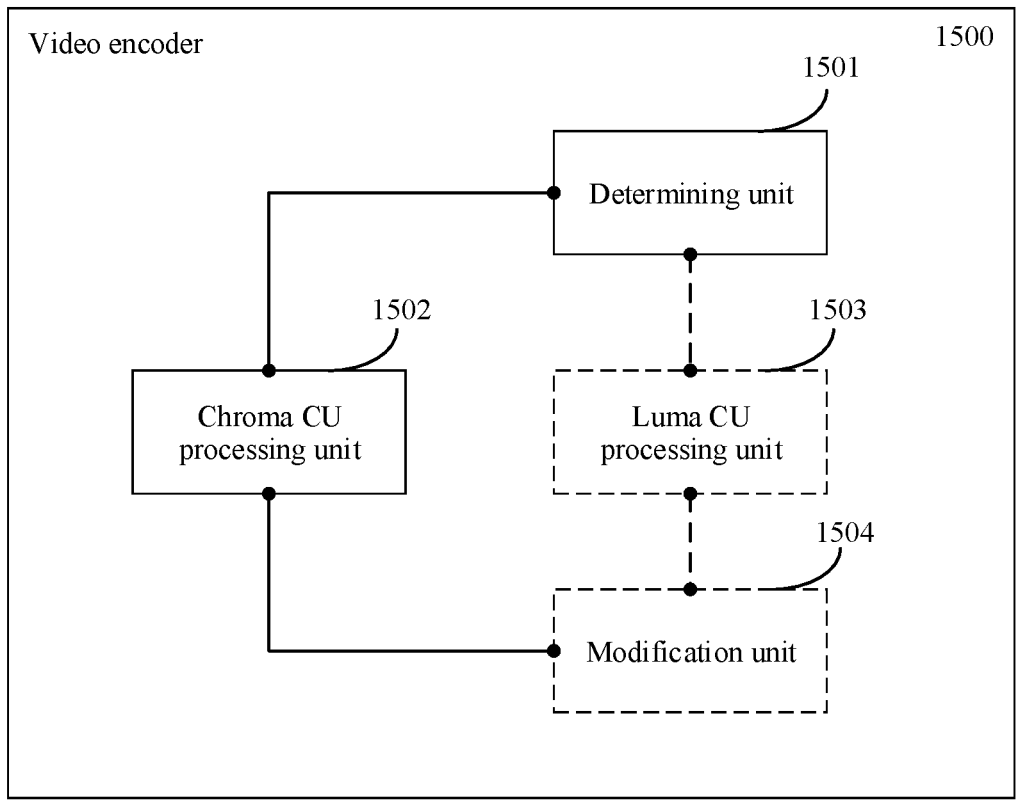
FIG. 15 is a diagram of a structure of a video encoder according to another embodiment of the present disclosure.

FIG. 15 shows a structure of a video encoder 1500 according to an embodiment of this application. The video encoder 1500 includes:

a determining unit 1501, configured to determine that a current CU is a luma CU, a luma-chroma CU, or a chroma CU, where the current CU is any CU in a current QG; and a chroma CU processing unit 1502, configured to: when the current CU is a chroma CU, separately perform the following processing on at least one luma CU corresponding to the current CU: if the luma CU has no residual, and both a luma CU and a luma-chroma CU that have been encoded before the luma CU in the current QG have no residual, modifying a basic QP of the luma CU to a predictive QP, where the at least one luma CU includes a luma CU corresponding to a preset position of the current CU; setting a basic QP of the current CU to the basic QP of the luma CU corresponding to the preset position of the current CU; and performing encoding processing on the current CU based on the basic QP of the current CU.

In some embodiments, the determining unit 1501 may be further configured to determine that a second CU is a luma CU or a luma-chroma CU, where the second CU is any CU in the current QG. Correspondingly, the video encoder 1500 may further include: a luma CU processing unit 1503, configured to set a basic QP of the second CU to a target QP, and perform encoding processing on the second CU based on the basic QP of the second CU.

In some embodiments, the video encoder 1500 may further include: a modification unit 1504, configured to: after encoding processing for all CUs in the QG is completed, determine a first luma CU or luma-chroma CU having a residual in all the CUs; and modify basic QPs of CUs except the at least one luma CU in all luma CUs and luma-chroma CUs that have been encoded before the first luma CU or luma-chroma CU having a residual to the predictive QP; or modify basic QPs of all luma-chroma CUs that have been encoded before the first luma CU or luma-chroma CU having a residual to the predictive QP.

The video encoder shown in FIG. 12 to FIG. 15 may be the encoder shown in FIG. 2. Units included in the video encoder shown in FIG. 12 to FIG. 15 may be included in the quantization unit 208, the inverse quantization unit 201, or the inverse quantization unit 310. It may be understood that units included in the video encoder shown in FIG. 12 to FIG. 15 may alternatively be units newly added on the basis of the encoder shown in FIG. 2.

In this embodiment of this application, the performing encoding processing on the current CU based on the basic QP of the current CU may include: performing quantization processing on the current CU based on the basic QP of the current CU, that is, performing at an encoder side; or performing dequantization processing on the current CU based on the basic QP of the current CU, that is, performing at an encoder side or a decoder side.

In this embodiment of this application, for a luma CU, a luma QP in the CU is a basic QP of the CU; for a chroma CU, a chroma basic QP in the CU is a basic QP of the CU; or for a luma-chroma CU, a luma QP in the CU is a basic QP of the CU, and a chroma basic QP in the CU is equal to the luma QP.

In this embodiment of this application, the target QP is a sum of the predictive QP and a delta QP.

In this embodiment of this application, the preset position may be a central position, a bottom-left corner position, or a bottom-right corner position.

Arithmetic Operators

For definitions of the arithmetic operators, refer to 0.

Definition of arithmetic operator

| Arithmetic operator | Definition |
| --- | --- |
| + | Addition operation |
| − | Subtraction operation (binary operator) or negation (unary prefix operator) |
| × | Multiplication operation |
| $a^b$ | Exponentiation operation, which indicates a to the $b^{th}$ power, or may indicate a superscript |
| / | Exact division operation, which is truncated in a value direction to 0. For example, 7/4 and −7/−4 are truncated to 1, and −7/4 and 7/−4 are truncated to −1 |
| ÷ | Division operation without truncation or rounding |
| $\frac{a}{b}$ | Division operation without truncation or rounding |
| $\sum_{i=a}^{b} f(i)$ | An accumulated sum of a function f(i) when an independent variable i takes all integer values from a to b (including b) |
| a % b | Modular operation, which indicates a remainder of a divided by b, where both a and b are positive integers |
| ⌈·⌉ | Rounding up |

Logical Operators

For definitions of the logical operators, refer to 0.

Definition of logical operator

| Logical operator | Definition |
| --- | --- |
| a && b | Logical AND operation between a and b |
| a \|\| b | Logical OR operation between a and b |
| ! | logical NOT operation |

Relational Operators

For definitions of the relational operators, refer to 0.

Definition of relational operator

| Relational operator | Definition |
| --- | --- |
| > | Greater than |
| >= | Greater than or equal to |
| < | Less than |
| <= | Less than or equal to |
| == | Equal to |
| != | Not equal to |

Bitwise Operators

For definitions of the bitwise operators, refer to 0.

Definition of bitwise operator

| Bitwise operators | Definition |
| --- | --- |
| & | AND operation |
| \| | OR operation |
| ~ | Negation operation |
| a >> b | Shifts a to the right by b bits in the form of a two's complement representation, where this operation is defined only when b is a positive number |
| a << b | Shifts a to the left by b bits in the form of a two's complement representation, where this operation is defined only when b is a positive number |

Assignment

For definitions of assignment operators, refer to 0.

Definition of assignment operator

| Assignment operation | Definition |
| --- | --- |
| = | Assignment operator |
| ++ | Incremental, where x ++ is equivalent to x = x + 1, and when the operator is used for an array subscript, a value of a variable is calculated before an auto-increment operation |
| − − | Decremental, where x − − is equivalent to x = x − 1 when the operator is used for an array subscript, a value of a variable is calculated before an auto-decrement operation |
| += | Automatically add a specified value, for example, x += 3 is equivalent to x = x + 3, and x += (−3) is equivalent to x = x + (−3) |
| −= | Automatically subtract a specified value, for example, x −= 3 is equivalent to x = x − 3, and x −= (−3) is equivalent to x = x − (−3) |

Mathematical Functions

For definitions of the mathematical functions, refer to a formula (1) to a formula (11).

$$\text{Abs}(x) = \begin{cases} x; & x >= 0 \\ -x; & x < 0 \end{cases} \quad (1)$$

In the formula:
x represents an independent variable x.

$$\text{Ceil}(x) = \lceil x \rceil \quad (2)$$

In the formula:
x represents an independent variable x.

$$\text{Clip 1}(x) = \text{Clip 3}(0, 2^{BitDepth} - 1, x) \quad (3)$$

In the formula:
x represents an independent variable x; and
BitDepth represents precision of a coding sample.

$$\text{Clip 3}(i, j, x) = \begin{cases} i; & x < i \\ j; & x > j \\ x; & \text{others} \end{cases} \quad (4)$$

In the formula:
x represents an independent variable x;
i represents a lower bound; and
j represents an upper bound.

$$\text{Median}(x,y,z) = x+y+z - \text{Min}(x, \text{Min}(y,z)) - \text{Max}(x, \text{Max}(y,z)) \quad (5)$$

In the formula:
x represents an independent variable x;
y represents an independent variable y; and
z represents an independent variable z.

$$\text{Min}(x, y) = \begin{cases} x; & x <= y \\ y; & x > y \end{cases} \quad (6)$$

In the formula:
x represents an independent variable x; and
y represents an independent variable y.

$$\text{Max}(x, y) = \begin{cases} x; & x >= y \\ y; & x < y \end{cases} \quad (7)$$

In the formula:
x represents an independent variable x; and
y represents an independent variable y.

$$\text{Sign}(x) \begin{cases} 1; & x >= 0 \\ -1; & x < 0 \end{cases} \quad (8)$$

In the formula:
x represents an independent variable x.

$$\text{Log}(x) = \log_2 x \quad (9)$$

In the formula:
x represents an independent variable x.

$$\text{Ln}(x) = \log_e x \quad (10)$$

In the formula:
x represents an independent variable x; and
e represents the base of a natural logarithm, and a value of e is 2.718281828 . . . .

$$\text{Rounding}(x, s) = \text{Sign}(x) \times ((\text{Abs}(x) + (1 \ll (s-1))) \gg s) \quad s \geq 1 \quad (11)$$

In the formula:
x represents an independent variable x; and
s represents an independent variable s.

Structure Relational Operator

For definitions of the structure relational operator, refer to 0.

| Structure relational operator | |
|---|---|
| Structure relational operator | Definition |
| -> | For example, a ->b indicates that a is a structure and b is a member variable of a |

A person skilled in the art can understand that, the functions described with reference to various illustrative logical blocks, modules, and algorithm operations disclosed and described in this specification can be implemented by hardware, software, firmware, or any combination thereof. If software is used for implementation, the functions described with reference to the illustrative logical blocks, modules, and operations may be stored in or transmitted over a computer-readable medium as one or more instructions or code and executed by a hardware-based processing unit. The computer-readable medium may include a computer-readable storage medium. The computer-readable storage medium corresponds to a tangible medium such as a data storage medium, or a communications medium including any medium that facilitates transfer of a computer program from one place to another place (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include the computer-readable medium.

By way of example but not limitation, such computer-readable storage medium may include a RAM, a ROM, an EEPROM, a CD-ROM or another optical disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing items should also be included in the scope of the computer-readable medium.

Instructions may be executed by one or more processors such as one or more digital signal processors (DSPs), general-purpose microprocessors, application-specific integrated circuits (ASICs), field programmable gate arrays (FPGAs), or other equivalent integrated or discrete logic circuits. Therefore, the term "processor" used in this specification may refer to the foregoing structure, or any other structure suitable for implementing the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by using different hardware units. Actually, as described above, various units may be combined into a codec hardware unit in combination with appropriate software and/or firmware, or may be provided by interoperable hardware units (including one or more processors described above).

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A quantization parameter (QP) setting method, applied to a video picture encoding process, wherein the method comprises:
    determining whether a current coding unit (CU) is a chroma CU, wherein the current CU is any CU in a current quantization group (QG); and
    when the current CU is the chroma CU, performing the following processing on at least one luma CU corresponding to the current CU:
        determining whether the at least one luma CU has no residual, and both a previous luma CU and a luma-chroma CU that have been encoded in an encoding order of the current QG before the at least one luma CU in the current QG have no residual;
        responsive to the determining that the at least one luma CU has no residual, and both a previous luma CU and a luma-chroma CU that have been encoded in an encoding order of the current QG before the at least one luma CU in the current QG have no residual, modifying a basic QP of the at least one luma CU to a predictive QP of the current QG for predictive coding, wherein the at least one luma CU comprises a luma CU corresponding to a preset position of the current CU;
        setting a basic QP of the current CU to the basic QP of the at least one luma CU corresponding to the preset position of the current CU; and
        performing encoding processing on the current CU based on the basic QP of the current CU.

2. The method according to claim 1, wherein the method further comprises:
    determining whether a second CU is the luma CU or the luma-chroma CU, wherein the second CU is any CU in the current QG; and
    setting a basic QP of the second CU to a target QP, and performing encoding processing on the second CU based on the basic QP of the second CU.

3. The method according to claim 1, wherein the method further comprises:
    after encoding processing for all CUs in the QG is completed, determining a first luma CU or a luma-chroma CU having a residual in all the CUs; and
    modifying the basic QPs of CUs except the at least one luma CU in all luma CUs and luma-chroma CUs that have been encoded before the first luma CU or a luma-chroma CU having a residual to the predictive QP or modifying the basic QPs of all luma-chroma CUs that have been encoded before the first luma CU or the luma-chroma CU having a residual to the predictive QP.

4. The method according to claim 1, wherein the performing encoding processing on the current CU based on the basic QP of the current CU comprises:
    performing quantization processing on the current CU based on the basic QP of the current CU; or
    performing dequantization processing on the current CU based on the basic QP of the current CU.

5. The method according to claim 1, wherein
    for the at least one luma CU, a luma QP in the luma CU is the basic QP of the luma CU;
    for the chroma CU, a chroma basic QP in the chroma CU is the basic QP of the chroma CU; or
    for the luma-chroma CU, a luma QP in the luma-chroma CU is the basic QP of the luma-chroma CU, and a chroma basic QP in the luma-chroma CU is equal to the luma QP.

6. The method according to claim 2, wherein the target QP is a sum of the predictive QP and a delta QP.

7. The method according to claim 1, wherein the preset position is a central position, a bottom-left corner position, or a bottom-right corner position.

8. An apparatus, comprising:
    at least one processor; and
    one or more memories coupled to the at least one processor and storing programming instructions for execution by the at least one processor to cause the apparatus to:

determine whether a current coding unit (CU) is a chroma CU, wherein the current CU is any CU in a current quantization group (QG); and when the current CU is the chroma CU, perform the following processing on at least one luma CU corresponding to the current CU:

determine whether the at least one luma CU has no residual, and both a previous luma CU and a luma-chroma CU that have been encoded in an encoding order of the current QG before the at least one luma CU in the current QG have no residual;

responsive to the determining that the at least one luma CU has no residual, and both a previous luma CU and a luma-chroma CU that have been encoded in an encoding order of the current QG before the at least one luma CU in the current QG have no residual, modify a basic QP of the at least one luma CU to a predictive QP of the current QG for predictive coding, wherein the at least one luma CU comprises a luma CU corresponding to a preset position of the current CU;

set a basic QP of the current CU to the basic QP of the at least one luma CU corresponding to the preset position of the current CU; and perform encoding processing on the current CU based on the basic QP of the current CU.

9. The apparatus according to claim 8, wherein the programming instructions for execution by the at least one processor to cause the apparatus further to:

determine whether a second CU is the luma CU or the luma-chroma CU, wherein the second CU is any CU in the current QG; and set a basic QP of the second CU to a target QP, and performing encoding processing on the second CU based on the basic QP of the second CU.

10. The apparatus according to claim 8, wherein the programming instructions for execution by the at least one processor to cause the apparatus further to:

determine a first luma CU or a luma-chroma CU having a residual in all the CUs after encoding processing for all CUs in the QG is completed; and modify the basic QPs of CUs except the at least one luma CU in all luma CUs and luma-chroma CUs that have been encoded before the first luma CU or a luma-chroma CU having a residual to the predictive QP or modify the basic QPs of all luma-chroma CUs that have been encoded before the first luma CU or the luma-chroma CU having a residual to the predictive QP.

11. The apparatus according to claim 8, wherein when performing encoding processing on the current CU based on the basic QP of the current CU, the programming instructions for execution by the at least one processor to cause the apparatus further to:

perform quantization processing on the current CU based on the basic QP of the current CU; or perform dequantization processing on the current CU based on the basic QP of the current CU.

12. The apparatus according to claim 8, wherein for the at least one luma CU, a luma QP in the luma CU is the basic QP of the luma CU;

for the chroma CU, a chroma basic QP in the chroma CU is the basic QP of the chroma CU; or for the luma-chroma CU, a luma QP in the luma-chroma CU is the basic QP of the luma-chroma CU, and a chroma basic QP in the luma-chroma CU is equal to the luma QP.

13. The apparatus according to claim 9, wherein the target QP is a sum of the predictive QP and a delta QP.

14. The apparatus according to claim 8, wherein the preset position is a central position, a bottom-left corner position, or a bottom-right corner position.

15. A non-transitory computer-readable storage medium storing computer instructions, that when executed by one or more processors, cause the one or more processors to:

determine whether a current coding unit (CU) is a chroma CU, wherein the current CU is any CU in a current quantization group (QG); and when the current CU is the chroma CU, perform the following processing on at least one luma CU corresponding to the current CU:

determine whether the at least one luma CU has no residual, and both a previous luma CU and a luma-chroma CU that have been encoded in an encoding order of the current QG before the at least one luma CU in the current QG have no residual;

responsive to the determining that the at least one luma CU has no residual, and both a previous luma CU and a luma-chroma CU that have been encoded in an encoding order of the current QG before the at least one luma CU in the current QG have no residual, modify a basic QP of the at least one luma CU to a predictive QP of the current QG for predictive coding, wherein the at least one luma CU comprises a luma CU corresponding to a preset position of the current CU;

set a basic QP of the current CU to the basic QP of the at least one luma CU corresponding to the preset position of the current CU; and perform encoding processing on the current CU based on the basic QP of the current CU.

16. The non-transitory computer-readable storage medium according to claim 15, wherein the computer instructions, that when executed by one or more processors, further cause the one or more processors to:

determine whether a second CU is the luma CU or the luma-chroma CU, wherein the second CU is any CU in the current QG; and set a basic QP of the second CU to a target QP, and performing encoding processing on the second CU based on the basic QP of the second CU.

17. The non-transitory computer-readable storage medium according to claim 15, wherein the computer instructions, that when executed by one or more processors, further cause the one or more processors to:

determine a first luma CU or a luma-chroma CU having a residual in all the CUs after encoding processing for all CUs in the QG is completed; and modify the basic QPs of CUs except the at least one luma CU in all luma CUs and luma-chroma CUs that have been encoded before the first luma CU or luma-chroma CU having a residual to the predictive QP; or modifying the basic QPs of all luma-chroma CUs that have been encoded before the first luma CU or the luma-chroma CU having a residual to the predictive QP.

18. The non-transitory computer-readable storage medium according to claim 15, wherein when performing encoding processing on the current CU based on the basic QP of the current CU, the computer instructions, that when executed by one or more processors, further cause the one or more processors to:

perform quantization processing on the current CU based on the basic QP of the current CU; or perform dequantization processing on the current CU based on the basic QP of the current CU.

19. The non-transitory computer-readable storage medium according to claim 15, wherein
for the at least one luma CU, a luma QP in the luma CU is the basic QP of the luma CU;
for the chroma CU, a chroma basic QP in the chroma CU is the basic QP of the chroma CU; or
for the luma-chroma CU, a luma QP in the luma-chroma CU is the basic QP of the luma-chroma CU, and a chroma basic QP in the luma-chroma CU is equal to the luma QP.

20. The non-transitory computer-readable storage medium according to claim 16, wherein the target QP is a sum of the predictive QP and a delta QP.

* * * * *